United States Patent [19]
Carter et al.

[11] Patent Number: 5,987,506
[45] Date of Patent: Nov. 16, 1999

[54] REMOTE ACCESS AND GEOGRAPHICALLY DISTRIBUTED COMPUTERS IN A GLOBALLY ADDRESSABLE STORAGE ENVIRONMENT

[75] Inventors: John B. Carter, Salt Lake City, Utah; Scott H. Davis, Groton; Steven J. Frank, Hopkinton, both of Mass.

[73] Assignee: Mangosoft Corporation, Westborough, Mass.

[21] Appl. No.: 08/850,364

[22] Filed: May 2, 1997

Related U.S. Application Data

[63] Continuation-in-part of application No. 08/754,481, Nov. 22, 1996, and application No. 08/827,534, Mar. 28, 1997.

[51] Int. Cl.$^6$ .................................................. G06F 15/16
[52] U.S. Cl. ........................ 709/213; 709/201; 707/10; 711/147
[58] Field of Search .................. 395/200.43, 200.44, 395/200.45, 200.46; 709/201, 213, 214, 215, 216, 217, 218, 226; 711/147, 148, 130; 707/10

[56] References Cited

U.S. PATENT DOCUMENTS

| | | | |
|---|---|---|---|
| 4,096,567 | 6/1978 | Millard et al. ........................... | 364/200 |
| 4,426,688 | 1/1984 | Moxley .................................... | 365/200 |
| 4,710,926 | 12/1987 | Brown et al. ............................ | 371/9 |
| 4,868,738 | 9/1989 | Kish et al. ............................... | 395/846 |
| 4,934,764 | 6/1990 | Leitermann et al. .................... | 364/200 |
| 5,055,999 | 10/1991 | Frank et al. ............................ | 364/200 |
| 5,077,736 | 12/1991 | Dunphy, Jr. et al. .................. | 371/10.1 |
| 5,117,350 | 5/1992 | Parrish et al. ............................. | 711/1 |
| 5,119,481 | 6/1992 | Frank et al. ............................ | 395/325 |
| 5,226,039 | 7/1993 | Frank et al. ............................. | 370/60 |
| 5,245,563 | 9/1993 | Hauck, Jr. ............................... | 364/745 |
| 5,247,673 | 9/1993 | Costa et al. ............................. | 711/205 |
| 5,251,308 | 10/1993 | Frank et al. ............................. | 395/425 |
| 5,274,789 | 12/1993 | Costa et al. ............................. | 711/206 |
| 5,282,201 | 1/1994 | Frank et al. ............................ | 370/94.1 |
| 5,297,265 | 3/1994 | Frank et al. ............................ | 395/400 |
| 5,313,647 | 5/1994 | Kaufman et al. ....................... | 395/700 |
| 5,335,325 | 8/1994 | Frank et al. ............................ | 395/200 |
| 5,341,483 | 8/1994 | Frank et al. ............................ | 395/400 |
| 5,390,316 | 2/1995 | Cramer et al. ...................... | 395/200.31 |
| 5,390,326 | 2/1995 | Shah ....................................... | 395/575 |
| 5,394,555 | 2/1995 | Hunter et al. ............................ | 711/148 |

(List continued on next page.)

FOREIGN PATENT DOCUMENTS

| | | |
|---|---|---|
| 0 288 636 A2 | 11/1988 | European Pat. Off. . |
| 0 661 651 A1 | 7/1995 | European Pat. Off. . |
| 2 257 273 | 1/1993 | United Kingdom . |
| WO 95/14279 | 5/1995 | WIPO . |
| WO 95/22111 | 8/1995 | WIPO . |
| WO 95/25306 | 9/1995 | WIPO . |
| WO 96/23268 | 8/1996 | WIPO . |
| WO 96/30847 | 10/1996 | WIPO . |

OTHER PUBLICATIONS

WebGlimpse search site http://library.med.nyu.edu/library/webglimpse.html, Oct. 1998.

"Support for Collaborative Design: Agents and Emergence, Edmonds et al.," Communications of the ACM, Jul. 1994, vol. 37, No. 7, pp. 41–47.

"Software Agents," Genesereth et al., Communications of the ACM, Jul. 1994, vol. 37, No. 7, pp. 48–53.

(List continued on next page.)

*Primary Examiner*—Mehmet B. Geckil
*Attorney, Agent, or Firm*—Testa, Hurwitz & Thibeault, LLP

[57] ABSTRACT

A computer system employs a globally addressable storage environment that allows a plurality of networked computers to access data by addressing even when the data is stored on a persistent storage device such as a computer hard disk and other traditionally non-addressable data storage devices. The computers can be located on a single computer network or on a plurality of interconnected computer networks such as two local area networks (LANs) coupled by a wide area network (WAN). The globally addressable storage environment allows data to be accessed and shared by and among the various computers on the plurality of networks.

22 Claims, 13 Drawing Sheets

U.S. PATENT DOCUMENTS

| | | | |
|---|---|---|---|
| 5,408,649 | 4/1995 | Beshears et al. | 395/575 |
| 5,423,037 | 6/1995 | Hvasshovd | 395/600 |
| 5,452,447 | 9/1995 | Nelson et al. | 395/650 |
| 5,490,272 | 2/1996 | Mathis et al. | 395/650 |
| 5,493,728 | 2/1996 | Solton et al. | 395/250 |
| 5,513,314 | 4/1996 | Kandasamy et al. | 395/182.04 |
| 5,519,855 | 5/1996 | Neeman et al. | 395/600 |
| 5,522,045 | 5/1996 | Sandberg | 395/200.43 |
| 5,551,035 | 8/1996 | Arnold et al. | 395/650 |
| 5,560,027 | 9/1996 | Watson et al. | 395/800 |
| 5,560,029 | 9/1996 | Papadopoulos | 395/800 |
| 5,588,147 | 12/1996 | Neeman et al. | 395/601 |
| 5,592,625 | 1/1997 | Sandberg | 395/200 |
| 5,613,079 | 3/1997 | Debique et al. | 395/468 |
| 5,617,537 | 4/1997 | Yamada et al. | 395/842 |
| 5,649,194 | 7/1997 | Miller et al. | 707/200 |
| 5,675,787 | 10/1997 | Miller et al. | 707/104 |
| 5,687,308 | 11/1997 | Jardine et al. | 395/182.02 |
| 5,689,700 | 11/1997 | Miller et al. | 707/10 |
| 5,701,462 | 12/1997 | Whitney et al. | 395/610 |
| 5,727,150 | 3/1998 | Landon et al. | 395/200.43 |
| 5,768,510 | 6/1998 | Gish | 395/200.33 |
| 5,778,429 | 7/1998 | Sukegawa et al. | 711/129 |
| 5,781,537 | 7/1998 | Ramaswami et al. | 370/254 |
| 5,802,578 | 9/1998 | Lovett | 711/147 |
| 5,805,785 | 9/1998 | Dias et al. | 395/182.02 |
| 5,805,786 | 9/1998 | Badovinatz et al. | 395/182.02 |
| 5,812,533 | 9/1998 | Cox et al. | 370/259 |
| 5,812,751 | 9/1998 | Ekrot et al. | 395/182.02 |
| 5,832,514 | 11/1998 | Norin et al. | 707/202 |
| 5,909,540 | 6/1999 | Carter et al. | 395/182.02 |

OTHER PUBLICATIONS

Henskens et al. "Course and Fine Grain Objects in a Distributed Persistent Store," Object Orientation in Operating Systems, 1993, IEEE, pp. 116–123.

Amaral et al. "A Model for Persistent Shared Memory Addressing in Distributed Systems," Object Orientation in Operating Systems, 1992, IEEE, pp. 2–11.

Irelenbusch et al. "Towards a Resilient Shared Memory Concept for Distributed Persistent Object Systems," Proceedings of the 28th Annual Hawaii Intl. Conference on System Sciences, 1995, IEEE, pp. 675–684.

Lea et al. "COOL: System Support for Distributed Programming," *Communications of the ACM*, vol. 36, No. 9, pp. 37–46.

European Patent Office, European Search Report, Application No. EP 97 30 9471, mailed on Apr. 23, 1998, 3 pages.

Patent Cooperation Treaty, International Search Report, International Application No. PCT/US97/21457, mailed on Apr. 23, 1998, 4 pages.

Patent Cooperation Treaty, International Search Report, International Application No. PCT/US 97/21458, mailed on Apr. 23, 1998, 3 pages.

Patent Cooperation Treaty, International Search Report, International Application No. PCT/US 97/21459, mailed on Apr. 23, 1998, 4 pages.

Patent Cooperation Treaty, International Search Report, International Application No. PCT/US 97/21460, mailed on Apr. 23, 1998, 5 pages.

Patent Cooperation Treaty, International Search Report, International Application No. PCT/US 97/21466, mailed on Apr. 23, 1998, 3 pages.

Patent Cooperation Treaty, International Search Report, International Application No. PCT/US 97/21733, mailed on Apr. 23, 1998, 3 pages.

Patent Cooperation Treaty, International Search Report, International Application No. PCT/US 97/21734, mailed on Apr. 23, 1998, 4 pages.

Anderson, T., et al. "Serverless Network File Systems," *Operating Systems Review (SIGOPS)*, vol. 29, No. 5, Dec. 1, 1995, pp. 109–126.

Carter, J., et al. "Network Multicomputing Using Recoverable Distributed Shared Memory," Proceedings of the Spring Computer Society International Conference (*COMPCON*), San Francisco, Feb. 22–26, 1993, pp. 519–527.

Huber, J. et al. "PPFS: A High Performance Portable Parallel File System," *Proceedings of the International Conference on Supercomputing*, Barcelona, Jul. 3–7, 1995, pp. 385–394.

"Java Dynamic Class Loader," *IBM Technical Disclosure Bulletin*, vol. 39, No. 11, Nov. 1996, pp. 107–108.

Lee, E., et al. "Petal: Distributed Virtual Disks," 7th International Conference on Architectural Support for Programming Languages and Operation Systems, Cambridge, MA, Oct. 1–5, 1996, pp. 84–92.

Neal, D. "The Harvest Object Cache in New Zealand," *Computer Networks and ISDN Systems*, vol. 11, No. 28, May 1996, pp. 1415–1430.

Raghavan, G. "A Domain Model of WWW Browsers," Proceedings of Southeastcon, Bringing Together Education, *Science and Technology*, Tampa, Apr. 11–14, 1996, pp. 436–439.

Ng, T. "The Design and Implementation of a Reliable Distributed Operating System—ROSE," Proceedings of the Symposium on Reliable Distributed Systems, Huntsville, Oct. 9–11, 1990, pp. 2–11.

Yeung, D., et al. "MGS" A Multigrain Shared Memory System, *Computer Architecture News*, vol. 24, No. 2, May 1, 1996, pp. 44–55.

Wilson, Andrew W., "Organization and Statistical Simulation of Hierarchical Multiprocessors," UMI Dissertation Information Service (1985).

Li, Kai, "Shared Virtual Memory on Loosely Coupled Multiprocessors," Yale University, Department of Computer Science, (Sep. 1986).

Wilson, Andrew W., "Hierachical Cache/Bus Architecture for Shared Memory Multiprocessors," *ACM*, pp. 244–252 (1987).

Carter, J.B. et al., "Optimistic Implementation of Bulk Data Transfer Protocols," In Proceedings of the 1989 Signetrics Conference, pp. 61–69 (May, 1989).

Carter, J.B. et als., "Distributed Operating Systems Based on a Protected Global Virtual Address Space," In the Proceedings of the Third Workshop on Workstation Operating Systems (WWOS)(May, 1992).

Carter, J.B. et als., "FLEX: A Tool for Building Efficient and Flexible Systems," In the Proceedings of the Fourth Workshop on Workstation Operating Systems ((WWOS)(Oct., 1993).

Carter, John B., "Design of the Munin Distributed Shared memory System," To appear in the special issue of the *Journal of Parallel and Distributed Computing* on distributed shared memory (1995).

Carter, J.B. et als., "Techniques for Reducing Consistency–Related Communication in Distributed Shared Memory Systems," *ACM Transactions on Computer Systems*, pp.205–243, vol. 13, No. 3 (Aug., 1995).

Carter, J.B. et als., "Reducing Consistency Traffic and Cache Misses in the Avalanche Multiprocessor," University of Utah technical report.

Tricord Systems, Inc. Web Page, http://www.tricord.com/2/10/10–3–96.html, printed on May 22, 1997.

Network Appliance, Inc. Web Page, http://www.netapp.com/products/level3/nfs.html, printed on May 22, 1997.

Network Appliance, Inc. Web Page, http://www.netapp.com/products/level3/ontap.html, printed on May 22, 1997.

Network Appliance, Inc. Web Page, http://www.netapp.com/products/level3/windows.html, printed on May 22, 1997.

Anderson et al. "Scheduler Activations: Effective Kernel Support for the User–Level Management of Parallelism," *Operating Systems Review (SIGOPS)*, vol. 25, No. 1, Jan. 1, 1991, pp. 95–109.

Barton–Davis et al. "Adding Scheduler Activations to Mach 3.0," Proceedings of the USENIX Mach III Symposium, Santa Fe, NM, USA, Apr. 19–21, 1993, pp. 119–136.

Dryden, P. "Users throwing cache at networks delays" *Computerworld*, Oct. 7, 1996, http://ww.computerworld.com/search/AT–html/9610/961007SL41cacheb.html, originally printed on May 22, 1997, reprinted on Nov. 18, 1998.

Enterprise Networking Web Page, http://www.lancache.com/enad1.html, printed on May 20, 1997.

Koppe C. "Sleeping Threads: A Kernel Mechanism for Support of Efficient User Level Threads," Proceedings of Seventh IASTED–ISMM International Conference on Parallel and Distributed Computing and Systems, Washington, DC, Oct. 19–21, pp. 11–15.

Measurement Techniques Inc. Web Page, http://www.lancache.com/pr1_4.html, printed on May 20, 1997.

Measurement Techniques Inc. Web Page, http://www.lancache.com/slc.html, printed on May 20, 1997.

Network Appliance, Inc. Web Page, http://www.netapp.com/news/level3b/news_rel_970421.html, printed on May 22, 1997.

Network Appliance, Inc. Web Page, http://www.netapp.com/products/level3/netcache datasheet.html, printed on May 22, 1997.

Network Appliance, Inc. Web Page, http://www.netapp.com/products/level3/webfiler.html, printed on May 22, 1997.

Peak Technologies, Inc. Web Page, http://www.peak–media.com/PeakJet/quick.html, printed on May 20, 1997.

Peak Technologies, Inc. Web Page, http://www.peakJet/PeakJet.html, printed on May 20, 1997.

Relay Web Page, http://www.relay.com/product/gold.html, printed on May 22, 1997.

Relay Web Page, http://www.relay.com/product/otg.html, printed on May 22, 1997.

Sequel Technology Web Page, http://www.sequeltech.com/product/netPIM/prodinfo.html, printed on May 22, 1997.

Stac Inc. Web Page, http://www.stac.com/replica/pr–legato-agreement.html, printed on May 22, 1997.

CLOUD A'S PHYSICAL VIEW

CLOUD B'S PHYSICAL VIEW

LOGICAL VIEW OF
SHARED FILE SYSTEM

REMOTE ACCESS AND GEOGRAPHICALLY DISTRIBUTED COMPUTERS IN A GLOBALLY ADDRESSABLE STORAGE ENVIRONMENT

CROSS-REFERENCE TO RELATED CASES

This application is a continuation-in-part of co-pending U.S. patent applications Ser. No. 08/754,481, filed Nov. 22, 1996, and Ser. No. 08/827,534, Mar. 28, 1997. The entirety of both of these applications is incorporated herein by reference.

TECHNICAL FIELD

The present invention relates in general to distributed computer workgroups and, more specifically, to a globally addressable storage environment that accommodates remote access and two or more interconnected computer networks.

BACKGROUND INFORMATION

The conventional computer network includes a number of client computers connected together and further connected to a server computer that stores the data and the programs that client computers employ during network operation. This configuration is generally referred to as a client-server network. Typically, each client is a conventional computer system that includes a private main memory, typically a RAM memory, and a persistent storage, typically a hard disk. The server is usually an expensive high end machine that includes a high speed processor unit and a large memory, often having ten to one hundred times more storage than the individual client computers. The clients and server cooperate to share data and services among the different users, and thereby the individual computers appear as a unified distributed system. To this end, the server acts as a central controller that provides through its large memory a central repository of network data, and that distributes services to the individual client computers, generally on an as-available basis. Typically, these services are provided by means of specialized software running on a high speed processor on the server computer.

The client-server computer networking model allows organizations of all sizes to utilize group productivity products such as e-mail. Many business organizations have grown to rely heavily on network services. Employees who travel typically need to access the same network services and resources provided to them at work. Field offices also frequently need to access the headquarters' network services. The term "telecommuter" has been used to describe an employee who stays at home and conducts business by accessing the network services provided at the traditional worksite. These types of users are sometimes referred to as "remote" or "remote clients" because they typically are located in a physically remote place from the networks and because they do not connect to the networks locally or directly. Remote users typically connect to the networks via telephone lines. The terms "remote access" and "remote networking" are frequently used to identify the situation in which a remote user accesses a computer network over analog or digital telephone lines. A remote user generally can utilize any type of computer to access the network including, for example, a personal computer, a workstation, or a portable computer such as a laptop computer, a notebook computer, or a palmtop computer. A remote user typically connects a modem (or other communications adapter such as a digital adapter if the telephones lines are wholly digital) to a serial port of the computer. The modem connected to the user's remote computer communicates over the telephone lines with another modem that is coupled to a device coupled to the network. The other modem and the device are located at the network that the remote client is attempting to access. The device can be coupled directly to the network, or it can be coupled to the network which the remote client is attempting to access via a communications link (e.g., a WAN link) to that network. The device typically is referred to as a "remote access server" or a "remote access device." A typical remote access device provides a point of network access for one or more remote clients.

Although computer networks based on the client-server model generally have been successful at providing users with necessary computer services, as the user demands on computer systems have increased, the weaknesses in the client-server network are beginning to place limits on the services that can be provided.

An additional problem with client-server networks is that they provide a static operating environment that is set for optimal performance at a certain level of network activity. Consequently, client-server networks fail to exploit available resources as network activity changes and cannot improve system performance. In particular, as network activity rises above or drops below the expected level, the static operating environment of a client-server network lacks any ability to reconfigure dynamically the allocation of network resources to a configuration providing better performance for the present level of activity.

Moreover, the client-server computer networking model requires that computer programs written to operate in a client-server environment distribute themselves between clients and the server. This requires that the application programs implement a set of functions that divide the program between the clients and the server. This distribution of the application programs requires that the client-server application programs be quite complex. For example, a client-server computer application program that shares data between different machines must include functionality that allows for the distribution of multiple copies of data files, the maintenance of coherency for the distributed copies, and other such low-level management services.

Further troubling is that the client-server network stores all important applications and data files in the memory of the server system. Consequently, the client-server network is subject to complete system failure each time the server system crashes.

While the present client-server computer architecture is employed widely, it generally fails to provide an adequate response to the increased demands of today's networked computer users. Remote access generally provides additional complications for and performance degradation of the client-server networking model.

SUMMARY OF THE INVENTION

It is an object of the invention to provide improved networked computer systems.

A further object of the invention is to provide computer network systems that have adaptable system configurations for dynamically exploiting distributed network resources and thereby increasing network performance and productivity.

Another object of the invention is to provide computer network systems that have improved fault tolerance and that are more readily scaleable to allow the addition of more network nodes as well as to allow the interconnection of two or more networks.

It is yet a further object of the invention to provide a globally addressable storage system that allows remote computers and computers on different, interconnected networks to communicate and share data in a transparent and dynamic manner.

It is still another object of the invention to provide a globally addressable storage system that employs data migration and replication across interconnected network boundaries and among remote access computers.

The environment in which the invention operates includes systems that create and manage a virtual storage space shared by each computer on a network. The virtual space spans each storage device (e.g., RAM and hard disk) connected to the network. Accordingly, all data stored on the network can be stored within the virtual space and the actual physical location of the data can be in any of the storage devices connected to the network. More specifically, the system can create or receive a global address signal that represents a portion (e.g., 4 kilobytes) of the virtual space. The global address signal can be decoupled from (i.e., unrelated to) the physical and virtual address spaces of the underlying computer hardware to provide support for a memory space large enough to span each volatile (e.g., RAM, etc.) and persistent (e.g., hard disk, tape drive, etc.) storage device connected to the network. For example, systems of the invention can operate on 32-bit computers, but can employ global address signals that can be 128 bits wide. Accordingly, the virtual memory space spans $2^{128}$ bytes, which is much larger than the $2^{32}$ address space supported by any one of the underlying computer hardware. Such a huge address space is large enough to provide a separate address for every byte of data storage on the network including all RAM, disk, and tape storage. With such a huge virtual space, typically only a small portion is storing data at any time. Accordingly, the system includes a directory manager that tracks those portions of the virtual space that are in use. The system provides physical storage for each portion of the virtual space in use by mapping (i.e., assigning) each such portion to a physical device such as RAM or a hard disk. In general, the mapping provides a level of indirection that facilitates data migration, fault-tolerant operation, and load balancing. By allowing each computer to monitor and track which portions of the virtual space are in use, each computer can share the space. This allows the networked computers to appear to have a single memory, and therefore can allow application programs running on different computers to communicate using techniques currently employed to communicate between applications running on the same machine.

A computer system according to the invention employs a globally addressable storage environment that allows a plurality of networked computers to access data by addressing even when the data is stored on a persistent storage device such as a computer hard disk and other traditionally non-addressable data storage devices. The computers can be located on a single computer network or on a plurality of interconnected computer networks such as two local area networks (LANs) coupled by a wide area network (WAN). Also, the computers can include remote computers that access the network(s) via a communications adapter (e.g., a modem) and the telephone lines. The globally addressable storage environment allows data to be accessed and shared by such remote computers and among the computers on the plurality of networks.

In one aspect, the invention involves a computer system comprising a computer network, a persistent data storage device coupled to the network, a globally addressable data storage system, and a plurality of computers coupled to the network and the globally addressable data storage system. The globally addressable storage system provides addressable access to data stored in the persistent data storage device. The plurality of computers access data stored in the persistent data storage device by addressing via the globally addressable data storage system. At least one of the computers can be located remote from the network and coupled thereto by, for example, a communications adapter such as a modem. The globally addressable data storage system preferably replicates and/or migrates data stored in the persistent data storage device among two or more of the computers based on, for example, accesses by the computers of the globally addressable data storage system to obtain data stored in the persistent data storage device.

In another aspect, the invention involves a computer system comprising a first computer network coupled to a second, remote computer network. The first computer network includes a first plurality of computers, a first persistent data storage device, and a first globally addressable data storage system that maintains and allows access to data on the first network and that provides addressable access to data stored in the first persistent data storage device. The second computer network includes a second plurality of computers, a second persistent data storage device, and a second globally addressable data storage system that maintains and allows access to data on the second network and that provides addressable access to data stored in the second persistent data storage device. The first and second globally addressable data storage systems interoperate to allow the first computers to access data on the second network including data stored in the second persistent data storage device and to allow the second computers to access data on the first network including data stored in the first persistent data storage device. The first and second globally addressable data storage systems preferably replicate and/or migrate data among the various computers and persistent data storage devices.

Embodiments according to one or both of these aspects of the invention include, for example, security mechanisms, disconnect/reconcile mechanisms, and proxy mechanisms.

As for security, the first computer network can have a first security domain and the second computer network can have a second security domain that is separate from the first security domain, and the first and second computer networks share data between the first and second security domains. Furthermore, the first and second computers can set file-level or record-level access control rights on both the first and second computer networks, and the first and second globally addressable data storage systems can control access to data based on passwords or security identifiers.

As for disconnect/reconcile mechanisms, the first and second computers can access, and even modify, shared data after the first and second computer networks are disconnected. The modified shared data is reconciled after the first and second computer networks are reconnected.

As for proxy mechanisms, the first and second globally addressable data storage systems can utilize a proxy mechanism to maintain consistency of shared data.

Additionally, the first and second globally addressable data storage systems can utilize a global directory mechanism to track the location of the data on the first and second computer networks. This global directory mechanism can include a first directory for tracking data stored on the persistent data storage devices (e.g., hard disks) and a second directory for tracking data stored on volatile storage devices (e.g., RAM) on the first and second computer networks.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Before describing the invention, the environment in which the invention operates and other related details will be disclosed. More specifically, the first section of the following description appears under the heading "Structured Data Storage Systems," and it addresses possible practical systems (e.g., file systems, databases, etc.) that utilize the globally addressable storage system described in the second section appearing under the heading "Addressable Shared Memory Space." The third and final section of this description discloses the present invention, and it appears under the heading "Distributed Workgroups."

STRUCTURED DATA STORAGE SYSTEMS

In general, the structured data storage systems described under this heading are disclosed in the commonly-owned, incorporated-by-reference U.S. Pat. application Ser. No. 08/827,534, filed Mar. 28, 1997.

A network system 10 includes a plurality of network nodes that access a memory space storing a structured store of data, such as a structured file system or a database. Each of the nodes includes at least a data control program which accesses and manages the structured store of data. The structured store of data may be stored in an addressable shared memory or the structured store may be stored in a more traditional fashion. For example, each node may be responsible for storing a particular element or elements of the structured store of data. In such an embodiment, the data control program can access a desired portion of the structured store using a globally unique identifier. The underlying system would translate the identifier into one or more commands for accessing the desired data, including network transfer commands. In another embodiment, the structured store of data is stored in an addressable shared memory space, which allows the nodes to transparently access portions of the structured store using standard memory access commands.

The system 10 can be a file system, a database system, a Web server, an object repository system, or any other structured storage system that maintains an organized set of data. As used herein, the term "Web server" means any processor which transmits data objects (such as Active X objects), applications (such as JAVA applets), or files (such as HTML files), to a requester via Web protocols (e.g., http or ftp). In one disclosed embodiment, the system 10 is a file system that maintains various computer files. However, this is just one embodiment that is provided for illustrative purposes. Any one of a plurality of structured storage systems (e.g., database system, Web page system, Intranet, etc.) can be provided. This disclosure is not to be limited to the file system or other particular embodiments described herein.

Figure 1:
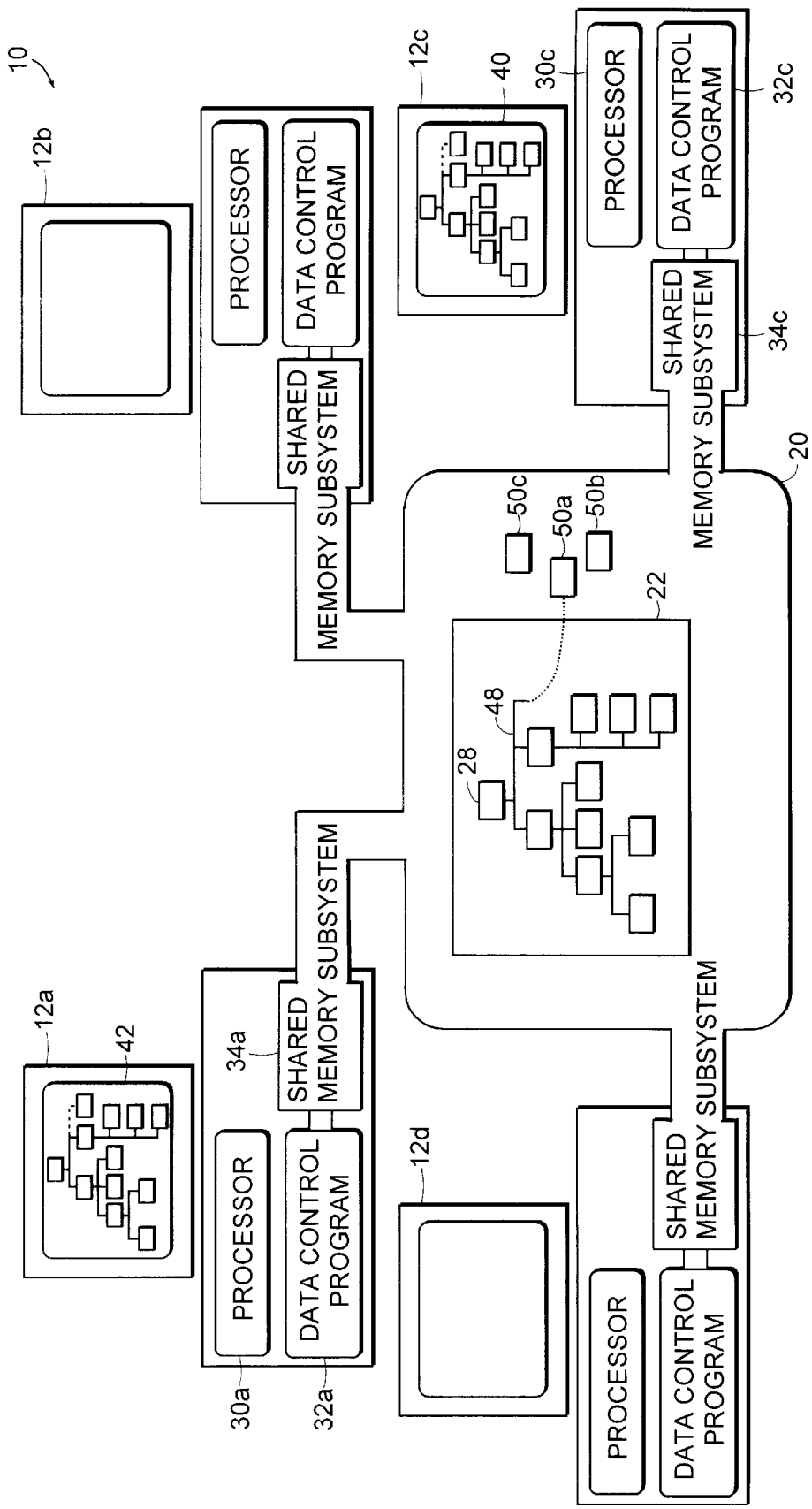
FIG. 1 is a conceptual block diagram of a distributed addressable shared memory structured data storage system.

Referring to FIG. 1, a network system 10 includes a plurality of network nodes 12a–12d and an addressable shared memory space 20 that has a portion 22 for storing a structured store of data 28. Each of the nodes 12a–12d can include several sub-elements. For example, node 12a includes a processor 30a, a data control program 32a, and a shared memory subsystem 34a. In the disclosed embodiment, two of the nodes, 12a and 12c, include monitors that provide displays 40 and 42 graphically depicting the structured store of data 28 within the addressable shared memory space 20. The addressable shared memory space 20 interconnects each of the network nodes 12a–12d and provides each node 12a–12d with access to the structured store of data 28 contained within the addressable shared memory space 20.

A system 10 can provide, among other things, each network node 12a–12d with shared control over the structured store of data 28 and, therefore, the system 10 can distribute control of the data store across the nodes of the network. To this end, each node of the system 10, such as node 12a, includes a data control program 32a that interfaces to a shared memory subsystem 34a. The data control program 32a can operate as a structured storage system, such as a file system, that is adapted to maintain a structured store of data and to employ the shared memory system as an addressable memory device that can store a structured store of data. At the direction of the data control program 32a, the shared memory subsystem 34a can access and store data within the addressable shared memory space 20. These cooperating elements provide a structured storage system that has a distributed architecture and thereby achieves greater fault tolerance, reliability, and flexibility than known structured storage systems that rely on centralized control and centralized servers. Accordingly, what is described is computer networks with distributively controlled and readily scaled file systems, database systems, Web page systems, object repositories, data caching systems, or any other structured storage system.

Still referring to FIG. 1, the system 10 maintains within the addressable shared memory space 20 a structured store of data 28. Each of the nodes 12a–12d can access the addressable shared memory space 20 through the shared memory subsystems 34a–34d. Each of the shared memory subsystems 34a–34d provides its node with access to the addressable shared memory space 20. The shared memory subsystems 34a–34d coordinate each of the respective node's memory access operations to provide access to the desired data and maintain data coherency within the addressable shared memory space 20. This allows the interconnected nodes 12a–12d to employ the addressable shared memory space 20 as a space for storing and retrieving data. At least a portion of the addressable shared memory space 20 is supported by a physical memory system that provides persistent storage of data. For example, a portion of the addressable shared memory space 20 can be assigned or mapped to one or more hard disk drives that are on the network or associated with one or more of the network nodes 12a–12d as local hard disk storage for those particular nodes. Accordingly, FIG. 1 illustrates that shared memory subsystems provide the network nodes with access to an addressable shared memory space, wherein at least a portion of that space is assigned to at least a portion of one or more of the persistent storage memory devices (e.g., hard disks) to allow the nodes addressably to store and retrieve data to and from the one or more persistent storage memory devices. A preferred embodiment of such an addressable shared memory space described in the commonly-owned U.S. patent application Ser. No. 08/754,481 file Nov. 22, 1996, and incorporated by reference above.

Therefore, one realization is that each of the nodes 12a–12d can employ its respective shared memory subsystem as a memory device that provides persistent data storage.

Each of the data control programs 32a–32d is a software module that couples to the respective shared memory subsystem 34a–34d in a way that operates similarly to an interface between a conventional data storage program and a local memory device. For example, the data control program 32a can stream data to, and collect data from, the shared memory subsystem 34a. Because the shared memory subsystems coordinate the memory accesses to the addressable shared memory space 20, each of the data control programs is relieved from having to manage and coordinate its activities with the other data control programs on the network or from having to manage and coordinate its activities with one or more central servers. Accordingly, each of the data control programs 32a–32d can be a peer incarnation (i.e., an instance) residing on a different one of the network nodes 12a–12d and can treat the respective shared memory subsystem 34a–34d as a local memory device such as a local hard disk.

One or more of the data control programs 32a–32d can provide a graphical user interface 42 that graphically depicts the structured store of data 28 contained within the addressable shared memory space 20. The graphical user interface 42 allows a user at a node, for example at node 12a, to insert data objects graphically within the structured store of data 28. To this end, the data control program 32a can generate a set of commands that will present a stream of data to the shared memory subsystem 34a and the shared memory subsystem 34a will employ the data stream to store an object within the structured store of data 28. Similarly, the other shared memory subsystems 34b–34d can provide information to their respective nodes that is indicative of this change to the structured store of data 28. Accordingly, as shown depicted in FIG. 1 for node 12c only for simplicity, that node (which includes a graphical user interface 40) reflects the change to the structured store of data 28 affected by the data control program 32a of the node 12a. In particular, the graphical user interface 40 of the node 12c can depict to a user that an object is being placed within the structured store of data 28. For example, the addressable shared memory space 20 also contains the data objects 50a–50c which can be placed within the structured data store 28 to become part of that structured data store. As illustrated, a system user at node 12a can direct object 50a to be inserted at a set location within the data store 28. The data control program 32a then directs the shared memory subsystem 34a to place the object 50a within the data store 28 at the proper location. Moreover, the shared memory subsystem 34c on node 12c detects the change within the data store 28 and reflects that change within the graphical user interface 40.

Figure 2:
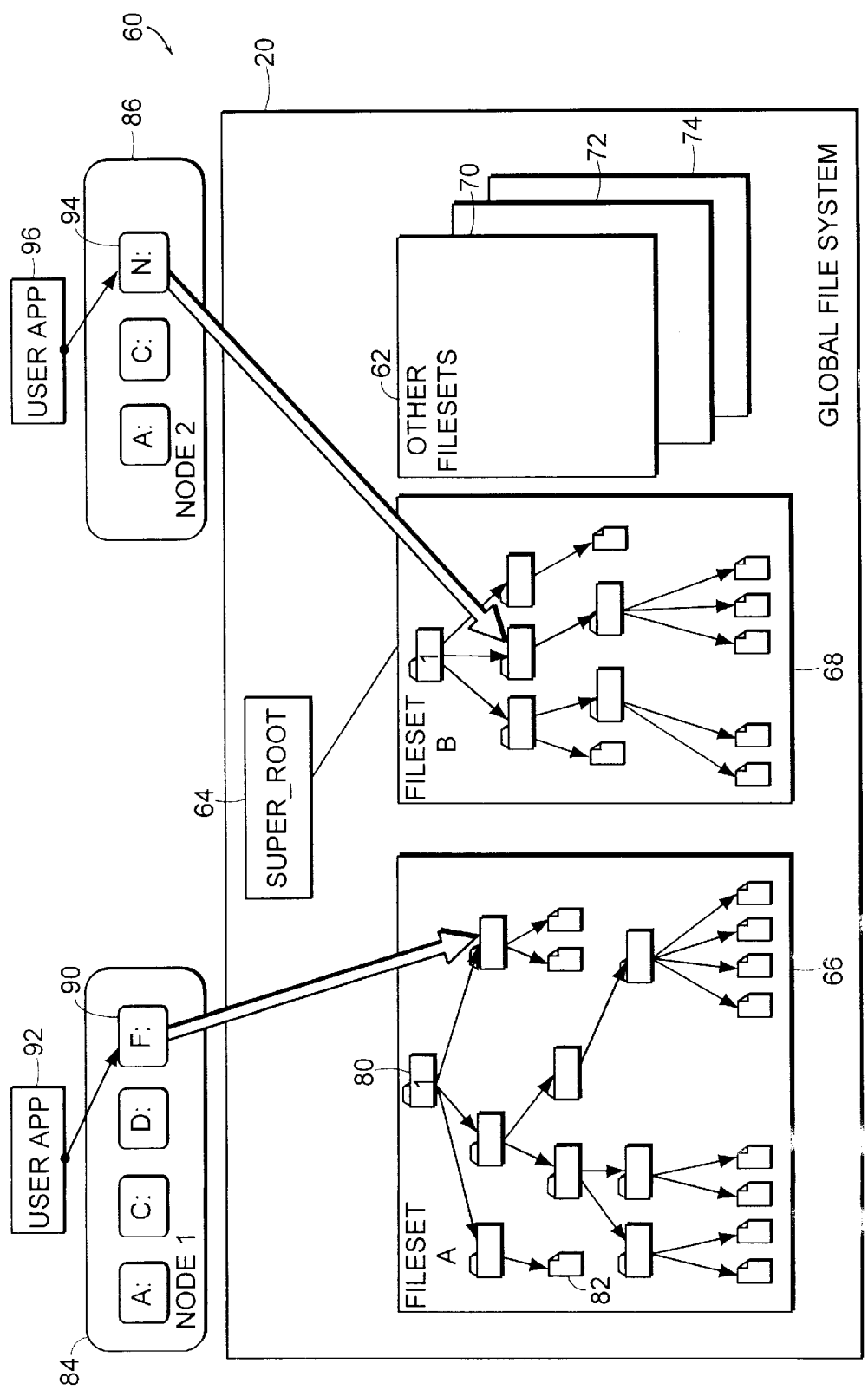
FIG. 2 is a diagram of one possible embodiment of the system of FIG. 1, namely a distributed addressable shared memory file system providing storage for computer files such as source code files, wordprocessing documents files, etc.

Referring now to FIG. 2, a structured file system 60 employs the properties of the addressable shared memory space 20 to implement what looks to all network nodes like a coherent, single file system when in fact it spans all network nodes coupled to the addressable shared memory space 20.

The file system 60 of FIG. 2 differs from known physical and distributed file systems in a variety of ways. In contrast to known physical file systems which map a file organization onto disk blocks, the file system 60 manages the mapping of a directory and file structure onto a distributed addressable shared memory system 20 which has at least a portion of its addressable space mapped or assigned to at least a portion of one or more persistent storage devices (e.g., hard disks) on the network. Unlike known distributed file systems, the file system 60 employs peer nodes, each of which have an incarnation or instance of the same data control program. Also, unlike known file systems generally, the file system 60: maintains data coherence among network nodes; automatically replicates data for redundancy and fault tolerance; automatically and dynamically migrates data to account for varying network usage and traffic patterns; and provides a variety of other advantages and advances, some of which are disclosed in the commonly-owned U.S. patent application Ser. No. 08/754,481 filed Nov. 22, 1996, and incorporated by reference above.

Still referring to FIG. 2, the file system 60 resides in part within the addressable shared memory space 20, and includes a structured store of data 62, a super root 64, file sets 66–74, directory entry 80, and file or document 82. Two network nodes 84 and 86 are shown accessing the addressable shared memory space 20 (in the manner described previously with reference to FIG. 1) via the logical drives 90 and 94. Application programs 92 and 96 executing on the nodes interact with the data control programs (not shown in FIG. 2 but shown in FIG. 1 as 32a–32d) and cause the data control programs in the nodes to access the logical drives 90 and 94. In the disclosed embodiment, the logical drives are DOS devices that "connect to" the fileset directories via Installable File System drivers associated with the file system 60.

The file system 60 supports one global file system per addressable shared memory space 20 shared by all of the network nodes. This global file system is organized into one or more independent collections of files, depicted as the filesets 66–74. A fileset can be thought as logically equivalent to a traditional file system partition. It is a collection of files organized hierarchically as a directory tree structure rooted in a root directory. The non-leaf nodes in the tree are the directories 80, and the leaves in the tree are regular files 82 or empty directories. Sub-directory trees within a fileset can overlap by linking a file to multiple directories.

A benefit of breaking up the file system 60 into filesets 66-74 is that it provides more flexible file system management for users of the system 60. As the file system 60 grows into very large sizes (e.g., hundreds of nodes with thousands of gigabits of storage), it is desirable to have the files organized into groups of management entities such that management actions can be independently applied to individual groups without affecting the operation of the others.

The filesets in the addressable shared memory space 20 are described and enumerated in a common structure, the root 64 of which provides the starting point to locate the filesets in the addressable shared memory space 20. The root 64 can be stored in a static and well-known memory location in the addressable shared memory space 20, and it can be accessed via a distributed shared memory system program interface. When a node is accessing a fileset for the first time, it first looks up the root 64 to determine the identifier associated with the fileset, e.g., the shared memory address used to access the fileset. Once it has determined the identifier, the node can access the root directory of the fileset. From the root directory, it then can traverse the entire fileset directory tree to locate the desired file. Filesets used by the file system 60 are described in greater detail below under the heading "Fileset."

Figure 3:
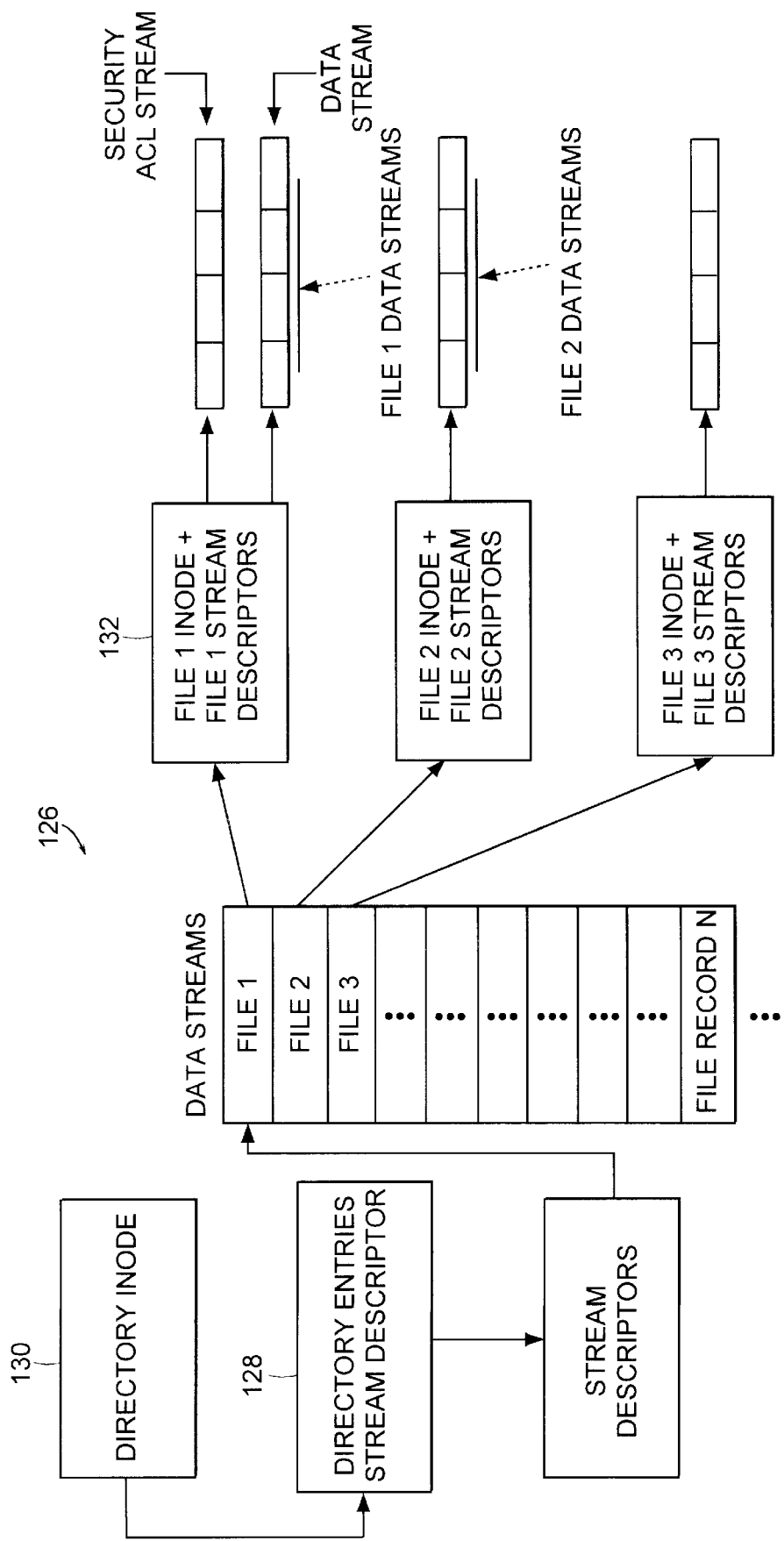
FIG. 3 is a graphical representation of the organization of directory entries and associated file descriptors (also known as "Inodes"), suitable for use with the file system of FIG. 2.

Referring to FIG. 3, in the disclosed embodiment of the file system 60, a directory 126 (such as the directory 80 of FIG. 2) is accessed by starting at a directory Inode or descriptor 128 containing an address that points to a directory entries stream descriptor 130. This descriptor 130 is a pointer to a block of data containing directory entries for files File 1 through File 3. The directory entry for File 1 has a number of entries; one of the entries is a string containing the name of the file and another entry is the address of the Inodes and stream descriptors 132. The stream descriptors for File 1 are used to locate and retrieve the various 4 kilobyte pages in the addressable shared memory space 20 that constitute File 1. Other files are retrieved and constructed from the addressable shared memory space 20 in the same fashion. The directories used by the file system 60 are described in greater detail below under the heading "Directory."

Figure 4:
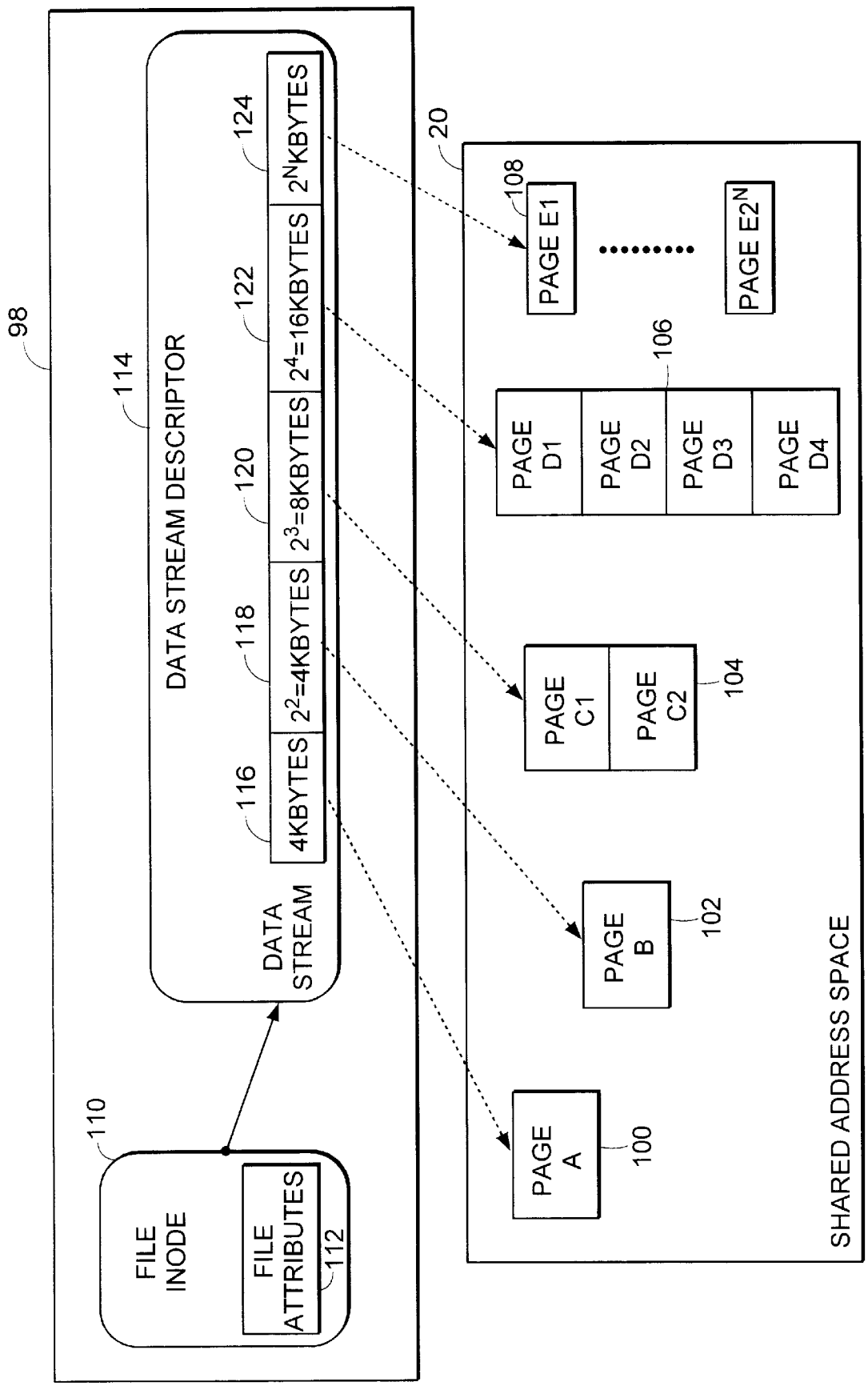
FIG. 4 is a diagram of an Inode suitable for use with the file system of FIG. 2.

In the embodiment of the file system 60 disclosed in FIG. 4, a file 98 (such as the file 82 of FIG. 2) is represented by one or more shared pages of data 100, 102, 104, 106, and 108 in the addressable shared memory space 20. Each file 98 has a file Inode or descriptor 110 that includes various file attributes 112. The file descriptor 110 contains an address that points to a data stream descriptor 114, and the data stream itself includes one or more addresses 116, 118, 120, 122, and 124 that point to particular pages in the identifiable shared memory space 20. In the disclosed embodiment, a page is the atomic unit in the addressable shared memory space 20, and it contains up to 4 kilobytes of data. Even if the entire 4 kbytes is not needed, an entire page is used. This is illustrated by the page 108 that only contains about 2 kbytes of data. The files used by the file system 60 are described in greater detail below under the heading "Files."

Fileset

The filesets are the basic unit for the file system 60. Each fileset is identified with a name having up to 255 characters. The file system 60 exports a set of fileset level operations that allow an administrator to manage the filesets through the following type of actions.

Fileset Creation: This operation creates a new fileset. The fileset is initially created with one file, the empty root directory. A default fileset is created automatically at the initialization of the addressable shared memory space 20.

Fileset Deletion: This operation deletes a fileset. All files in the fileset are removed, and all shared memory space allocated to the files in the fileset is discarded and the backing physical storage freed for new storage. The file system 60 will only allow deletion of a fileset until there are no open handles to file data stream in the fileset. In order to ready a fileset for deletion, the fileset must be "shutdown" by putting it off-line.

Fileset Enumeration: This operation enumerates a specific fileset, or all the filesets, in the addressable shared memory space 20.

Fileset Control: This operation performs fileset level control routines such as setting fileset attributes.

Mount Export Control: Directory are attached to local devices, i.e. "mounted" using parameters stored in the Windows NT registry, or some other similar central storage area for such information. When first started up, the data control program 60 accesses the central storage and determines which filesets should be mounted. The data control program creates a file object representing each fileset identified by the entries in the central storage. In some embodiments an API may be provided which allows the data control program 60 to dynamically mount and unmount filesets by making appropriate API calls.

The users of the file system 60 are not aware of the shared memory "logical volume," but rather view each fileset as a volume (or partition in the sense of a traditional physical file system). The Win32 Get VolumeInformation is used to get information on the fileset (more precisely, on the logical device on which the fileset is attached to). Because all the filesets share the same pool of the storage in the addressable shared memory space 20, the total volume size returned to the user for each fileset is the current aggregate storage capacity in the addressable shared memory space 20. The same approach is taken for the total free space information, and the aggregate value of the addressable shared memory space 20 is returned for each fileset.

Directory

Directory entry scanning is one of the most frequently performed operations by user applications. It is also may be the most visible operation in terms of performance. Consequently, much attention is directed to making the directory scan efficient and the WindowsNT File System (NTFS) duplicates sufficient file Inode information in the directory entry such that a read directory operation can be satisfied by scanning and reading the directory entries without going out to read the information from the file Inodes. The problem with this scheme is that the doubly stored file metadata, such as the file time stamps and file size, can be updated quite frequently, making the metadata update more expensive. However, this overhead is considered acceptable in face of the performance gained in directory scan operations.

The file system 60 adopts the same philosophy of providing efficient directory scanning by duplicating file Inode information in directory entries. Each directory entry contains sufficient information to satisfy the Win32 query file information requests. The file Inode is stored with the file stream descriptors on a separate page. The Inode is located via a pointer in the directory entry.

The file system's directory entries are stored in the directory file's directory entry data stream. To maximize space utilization, each directory entry is allocated on the first available free space in a page that can hold the entire entry. The length of the entry varies depending on the length of the file's primary name. The following information is part of the directory entry: creation time; change time; last write time; last accessed time; pointers to stream descriptor; pointer to parent directory Inode; MS-DOS type file attributes; and MS-DOS style file name (8.3 naming convention). For average file name lengths, a page contains up to about 30 entries. All the file information in the directory entry is also contained in the file Inode, except for the file primary name and MS-DOS file name. The file primary names and associated short names are only stored in the directory entries. This makes the Inode size fixed.

When a file information is modified (except for file names), the Inode is updated in the context of the update transaction and therefore always contains the most up-to-date information. The associated directory entry change is lazily flushed to reduce the cost of double updating. This means the Inode updates are either flushed or recoverable, but not the corresponding directory entry updates. If the directory entry gets out of synch with the Inode (when the Inode change is successfully flushed but not the directory change), the entry is updated the next time the Inode is updated. In order to facilitate synchronization of directory updates, the directory entries (Inodes) can not span multiple pages. FIG. 3 illustrates the organization of directory entries and associated Inodes.

Files

A file of the file system 60 comprises streams of data and the file system metadata to describe the file. Files are described in the file system 60 by objects called Inodes. The Inode is a data structure that stores the file metadata. It represents the file in the file system 60.

A data stream is a logically contiguous stream of bytes. It can be the data stored by applications or the internal information stored by the file system 60. The data streams are mapped onto pages allocated from the addressable shared memory space 20 for storage. The file system 60 segments a data stream into a sequence of 4 kilobyte segments, each segment corresponding to a page. The file system 60 maintains two pieces of size information per data stream: the number of bytes in the data stream; and the allocation size in number of pages. The byte-stream to segment/page mapping information is part of the file metadata and is stored in a structure called data stream descriptor. See FIG. 4.

Users' requests for data are specified in terms of range of bytes and the position of the starting byte measured by its offset from the beginning of the data stream, byte position zero. The file system 60 maps the offset into the page containing the starting byte and the intra-page offset from the beginning of the page.

Every file of the file system 60 has at least two data streams: the default data stream; and the Access Control List (ACL) stream. Each file may optionally have other data streams. The ACL stream is used to store the security Access Control Lists set on the file. Each data stream is individually named so that the user can create or open access to a specific data stream. The name of the default data stream is assumed to be the primary name of the file. To access a data stream, the user of the file system 60 must first open a file handle to the desired data stream by name. If the file name is used then the handle to the default data stream is opened. This open file handle represents the data stream in all the file system services that operates on the data stream.

The file system 60 exports a set of services to operate at the file level. The input to the services are the file object handle anode) or the data stream object handle, and the operation specific parameters, including the desired portions of the data stream in byte positions.

Open files are represented by data stream objects (or just file objects). Users access files using these file objects, identified to the users through file handles. A file handle is a 32-bit entity representing an instance of an open file stream. For example, WindowsNT creates the file object and returns a file handle to the users in response to the user request for file creation or file open. The file system 60 initializes a pointer to a file control block. Multiple file objects point to the same file control block and each file control block maintains separate stream objects for each open context. Externally, the file handle is opaque to the users. Multiple opens can be issued against the same file. When the user closes a file, the file object and the associated file handle is removed.

The file system 60 maps file streams into sequences of segments which become progressively larger; each segment corresponds to one or more pages. The file system 60 attempts to reserve contiguous pages for data streams but only allocates real backing storage on an as needed basis, usually as a result of a file extension requested by writing beyond the data stream allocation size. When a file extension request is received, the file system 60 rounds the extension size in number of bytes up to a multiple of 4 kilobytes to make it an integer number of pages, and requests pages for actual allocation. The number of 4 kilobyte pages allocated by the file system depends on the number of file extension requests made. The file system 60 allocate one 4 kilobyte page for the first extension request, two 4 kilobyte pages for the second request, four 4 kilobyte pages for the third extension request, and so on. The newly allocated pages are zero filled. By reserving contiguous pages, the file system 60 can reduce the amount of bookkeeping information on the byte offset to page mapping. The file system 60 reserves (sometimes much) larger than requested memory space for a file, and substantiates the storage by allocating backing storage page by page.

Four kilobyte allocation segments are chosen to reduce the unused storage space and yet provide a reasonable allocation size for usual file extensions. Since allocation is an expensive operation (most likely involving distributed operations), smaller allocation size is not efficient. Larger allocation size would lead to inefficient space utilization, or additional complexity to manage unused space. A 4 kilobyte segment also maps naturally to a page, simplifying the data stream segment to page mapping. Although an analogy could be made with the NTFS's allocation policy of 4 kilobyte clusters (segment) size for large disks to speed up allocation and reduce fragmentation, such analogy is not completely valid because the actual on-disk allocation segment size depends greatly on the local disk size and the physical file systems.

Similar to the NTFS, which controls the allocation of each disk partition and therefore can quickly determine the free volume space available for allocation, the file system 60 requests the total available space information and uses this information to quickly determine whether to proceed with the allocation processing. If the total available space is less than the required allocation size, the request is denied immediately. Otherwise, the file system 60 will proceed to allocate the pages to satisfy the request. The fact that the file system 60 can proceed with the allocation does not guarantee that the allocation will succeed, because the actual total available space may change constantly.

The file system 60 takes advantage of the page level replication capability of the underlying distributed addressable shared memory system 20 disclosed in the U.S. patent application incorporated by reference above. Page level replication allows the system to provide file replication. The data streams of a replicated file are backed by pages, which are themselves replicated. In this way, data streams are replicated automatically without intervention of the file system 60. The extra space consumed by the multiple replicas is not reflected in the file (data stream) sizes. The stream allocation size still reports the total allocation size in pages required for one replica. The pages backing temporary files, however, are not replicated.

File Access and Resource Sharing—Locking and Byte Range Locking

The shared memory provides the distribution mechanism for resource sharing among peer nodes running the file system 60 software. Each instance of the file system 60 on each network node views the shared memory resources (i.e., pages) as being shared with other local or remote threads. The file system 60 needs a way to implement high level, file system locks to provide consistent resource sharing. Any concurrency control structure can be used to implement locks, such as lock objects or semaphores. In database applications, locking may also be achieved by implementing concurrency control structures associated with database indices or keys. In file system applications access to files or directories may be controlled. Another example of file system locks is Byte Range Locking, which provides the users the ability to coordinate shared access to files. A byte range lock is a lock set on a range of bytes of a file. Coordinated shared access to a file can be accomplished by taking locks on the desired byte ranges. In general, the high level file system lock works in the following fashion: (a) a file system resource is to be shared by each file system 60 instance, and the access to the resource is coordinated by a locking protocol using a lock object data structure that represents the high level lock to coordinate the shared resource, and it is the value of the data structure that represents the current state of the lock; (b) to access the resource, the instance at each node must be able to look at the state (or value) of the lock data structure, and if it is "free," modify it so that it becomes "busy," but if it is "busy," then it has to wait to become "free," and there could be intermediate states between "free" and "busy" (i.e., more than two lock states), but in any event, in this byte range locking example, a lock is a description of a certain byte range being shared/exclusively locked by some thread of the file system 60, and a conflicting new byte range lock request that falls in or overlaps the already locked byte range will be denied or the requester may block (depending on how the request was made); and (c) access to or modification of the lock data structure by each node's instance needs to be serialized so that it in turn can then be used to coordinate high level resource sharing.

The locking features and capabilities of the shared memory engine described in the U.S. patent application Ser. No. 08/754,481, incorporated by reference above, allow the file system 60 to coordinate access to pages. The engine can also be used to coordinate access to resources, but in the case of complex high level resource locking such as Byte Range Locking, using the engine's locking features and capabilities directly to provide locks may be too costly for the following reasons: (a) each byte range lock would require a page representing the lock, and since the number of byte range locks can be large, the cost in terms of page consumption may be too high; and (b) the engine locks only provide two lock states (i.e., shared and exclusive), and high level file system locks may require more lock states.

The file system 60 implements the file system locking using the engine locking as a primitive to provide serialization to access and update the lock data structures. To read a lock structure, the file system 60 takes a shared lock on the data structure's page using the engine locking features and capabilities before it reads the page to prevent the data structure being modified. To modify the lock structure, it sets a exclusive lock on the page. The page lock is taken and released as soon as the lock structure value is read or modified.

With the serialization provided by the page locking and the page invalidation notification, the file system 60 implements the high level locks in the following way: (a) to take a file system lock (FS lock), the file system 60 sets a shared lock on the FS lock page and reads the page and then examines the lock structure; (b) if the lock structure indicates the resource is unlocked or locked in compatible lock mode, then the file system 60 requests to exclusively lock the page, and this guarantees only one file system 60 node instance can modify the lock data structure, and if the request succeeds then the file system 60 write maps the lock page and then changes the lock structure to set the lock and unlocks the page and sets page access to none; and (c) if the resource is locked in incompatible lock mode, the file system 60 unlocks the page but retains the page read mapped, and it then puts itself (the current thread) in a queue and waits for a system event notifying that the lock value has changed, and when the lock value does change then the file system 60 thread gets notified and repeats the step (a) above. The file system 60 implements the notification using a signal primitive. The file system 60 threads waiting for a lock are blocked on a system event. When the page containing the lock changes, a signal is sent to each blocked file system 60 thread. Each blocked file system 60 threads then wakes up and repeats step (a). FS locks are stored in volatile pages.

Byte Range Locking is a file system locking service exported to the users through the Win32 LockFile( ) and LockFileEx( ) API. It allows simultaneous access to different non-overlapping regions of a file data stream by multiple users. To access the data stream, the user locks the region (byte range) of the file to gain exclusive or shared read access to the region.

The file system 60 supports byte range locking for each individual data stream of the file. The following Win32-style byte range locking behavior is supported: (a) locking a region of a file is used to acquire shared or exclusive access to the specified region of the file, and the file system 60 will track byte range locks by file handle, therefore file handles provide a way to identify uniquely the owner of the lock; (b) locking a region that goes beyond the current end-of-file position is not an error; (c) locking a portion of a file for exclusive access denies all other processes both read and write access to the specified region of the file, and locking a portion of a file for shared access denies all other processes write access to the specified region of the file but allows other processes to read the locked region, and this means that the file system 60 must check byte range locks set on the data stream not only for lock requests but for every read or write access; (d) if an exclusive lock is requested for a region that is already locked either shared or exclusively by other threads, the request blocks or fails immediately depending on the calling option specified.; and (e) locks may not overlap an existing locked region of the file.

For each byte range lock, the file system 60 creates a byte range lock record to represent the lock. The record contains the following information: (a) byte range; (b) lock mode (shared or exclusive); (c) process identification; and (d) a Win32 lock key value.

The file system 60 regards the file byte ranges as resources with controlled access. For each byte range lock record, the file system 60 creates a file system lock (as discussed above) to coordinate the access to the byte range "resource." A compatible byte range lock request (share lock) translates into taking read lock on the file system lock associated with the byte range record. An exclusive byte range lock request is mapped to taking write lock on the file system lock.

Using the file system locking mechanism discussed above, lock requests waiting on the page containing the desired byte range will be notified when the page content changes.

ADDRESSABLE SHARED MEMORY SPACE

Having described structured data storage systems in some detail, a more detailed description is now provided of the addressable shared memory space that is disclosed in the commonly-owned U.S. patent application Ser. No. 08/754,481 filed Nov. 22, 1996, and incorporated by reference above. In general, all of the information provided under this heading is contained in that patent application.

The addressable shared memory system disclosed in the U.S. patent application incorporated by reference is an "engine" that can create and manage a virtual memory space that can be shared by each computer on a network and can span the storage space of each memory device connected to the network. Accordingly, all data stored on the network can be stored within the virtual memory space and the actual physical location of the data can be in any of the memory devices connected to the network.

More specifically, the engine or system can create or receive, a global address signal that represents a portion, for example 4k bytes, of the virtual memory space. The global address signal can be decoupled from, i.e. unrelated to, the physical and identifier spaces of the underlying computer hardware, to provide support for a memory space large enough to span each volatile and persistent memory device connected to the system. For example, systems can operate on 32-bit computers, but can employ global address signals that can be 128 bits wide. Accordingly, the virtual memory space spans $2^{128}$ bytes, which is much larger than the $2^{32}$ address space supported by the underlying computer hardware. Such an address space can be large enough to provide a separate address for every byte of data storage on the network, including all RAM, disk and tape storage.

For such a large virtual memory space, typically only a small portion is storing data at any time. Accordingly, the system includes a directory manager that tracks those portions of the virtual memory space that are in use. The system provides physical memory storage for each portion of the virtual memory space in use by mapping each such portion to a physical memory device, such as a RAM memory or a hard-drive. Optionally, the mapping includes a level of indirection that facilitates data migration, fault-tolerant operation, and load balancing.

By allowing each computer to monitor and track which portions of the virtual memory space are in use, each computer can share the memory space. This allows the networked computers to appear to have a single memory, and therefore can allow application programs running on different computers to communicate using techniques currently employed to communicate between applications running on the same machine.

In one aspect, the invention of the above-identified, incorporated-by-reference U.S. patent application can be understood to include computer systems having a addressable shared memory space. The systems can comprise a data network that carries data signals representative of computer readable information a persistent memory device that couples to the data network and that provides persistent data storage, and plural computers that each have an interface that couples to the data network, for accessing the data network to exchange data signals therewith. Moreover, each of the computers can include a shared memory subsystem for mapping a portion of the addressable memory space to a portion of the persistent storage to provide addressable persistent storage for data signals.

In a system that distributes the storage across the memory devices of the network, the persistent memory device will be understood to include a plurality of local persistent memory devices that each couple to a respective one of the plural computers. To this same end, the system can also include a distributor for mapping portions of the addressable memory space across the plurality of local persistent memory devices and a disk directory manager for tracking the mapped portions of the addressable memory space to provide information representative of the local persistent memory device that stores that portion of the addressable memory space mapped thereon.

The systems can also include a cache system for operating one of the local persistent memory devices as a cache memory for cache storing data signals associated with recently accessed portions of the addressable memory space. Further the system can include a migration controller for selectively moving portions of the addressable memory space between the local persistent memory devices of the plural computers. The migration controller can determine and respond to data access patterns, resource demands or any other suitable criteria or heuristic. Accordingly, the migration controller can balance the loads on the network, and move data to nodes from which it is commonly accessed. The cache controller can be a software program running on a host computer to provide a software managed RAM and disk cache. The RAM can be any volatile memory including SRAM, DRAM or any other volatile memory. The disk can be any persistent memory including any disk, RAID, tape or other device that provides persistent data storage.

The systems can also include a coherent replication controller for generating a copy, or select number of copies, of a portion of the addressable memory space maintained in the local persistent memory device of a first computer and for storing the copy in the local persistent memory device of a second computer. The coherent replication controller can maintain the coherency of the copies to provide coherent data replication.

The systems can also be understood to provide integrated control of data stored in volatile memory and in persistent memory. In such systems a volatile memory device has volatile storage for data signals, and the shared memory subsystem includes an element, typically a software module, for mapping a portion of the addressable memory space to a portion of the volatile storage. In these systems the volatile memory device can be comprised of a plurality of local volatile memory devices each coupled to a respective one of the plural computers, and the persistent memory device can be comprised of a plurality of local persistent memory devices each coupled to a respective one of the plural computers.

In these systems, a directory manager can track the mapped portions of the addressable memory space, and can include two sub-components; a disk directory manager for tracking portions of the addressable memory space mapped to the local persistent memory devices, and a RAM directory manager for tracking portions of the addressable memory space mapped to the local volatile memory devices. Optionally, a RAM cache system can operate one of the local volatile memory devices as a cache memory for cache storing data signals associated with recently accessed portions of the addressable memory space.

The systems can include additional elements including a paging element for remapping a portion of the addressable memory space between one of the local volatile memory devices and one of the local persistent memory devices; a policy controller for determining a resource available signal representative of storage available on each of the plural computers and, a paging element that remaps the portion of addressable memory space from a memory device of a first computer to a memory device of a second computer, responsive to the resource available signal; and a migration controller for moving portions of addressable memory space between the local volatile memory devices of the plural computers.

Optionally, the systems can include a hierarchy manager for organizing the plural computers into a set of hierarchical groups wherein each group includes at least one of the plural computers. Each group can include a group memory manager for migrating portions of addressable memory space as a function of the hierarchical groups.

The system can maintain coherency between copied portions of the memory space by including a coherent replication controller for generating a coherent copy of a portion of addressable memory space.

The system can generate or receive global address signals. Accordingly the systems can include an address generator for generating a global address signal representative of a portion of addressable memory space. The address generator can include a spanning unit for generating global address signals as a function of a storage capacity associated with the persistent memory devices, to provide global address signals capable of logically addressing the storage capacity of the persistent memory devices.

In distributed systems, the directory manager can be a distributed directory manager for storing within the distributed memory space, a directory signal representative of a storage location of a portion of the addressable memory space. The distributed directory manager can include a directory page generator for allocating a portion of the addressable memory space and for storing therein an entry signal representative of a portion of the directory signal. The directory page generator optionally includes a range generator for generating a range signal representative of a portion of the addressable memory space, and for generating the entry signal responsive to the range signal, to provide an entry signal representative of a portion of the directory signal that corresponds to the portion of the addressable memory space. Moreover, the distributed directory manager can include a linking system for linking the directory pages to form a hierarchical data structure of the linked directory pages as well as a range linking system for linking the directory pages, as a function of the range signal, to form a hierarchical data structure of linked directory pages.

As the data stored by the system can be homeless, in that the data has no fixed physical home, but can migrate, as resources and other factors dictate, between the memory devices of the network, a computer system can include a directory page generator that has a node selector for generating a responsible node signal representative of a select one of the plural computers having location information for a portion of the shared address space. This provides a level of indirection that decouples the directory from the physical storage location of the data. Accordingly, the directory needs only to identify the node, or other device, that tracks the physical location of the data. This way, each time data migrates between physical storage locations, the directory does not have to be updated, since the node tracking the location of the data has not changed and still provides the physical location information.

Accordingly, the system can include page generators that generate directory pages that carry information representative of a location monitor, such as a responsible computer node, that tracks a data storage location, to provide a directory structure for tracking homeless data. Moreover, the directory itself can be stored as pages within the virtual memory space. Therefore, the data storage location can store information representative of a directory page, to store the directory structure as pages of homeless data.

In another aspect, the invention of the above-identified, incorporated-by-reference U.S. patent application can be understood as methods for providing a computer system having a addressable shared memory space. The method can include the steps of providing a network for carrying data signals representative of computer readable information, providing a hard-disk, coupled to the network, and having persistent storage for data signals, providing plural computers, each having an interface, coupled to the data network, for exchanging data signals between the plural computers, and assigning a portion of the addressable memory space to a portion of the persistent storage of the hard disk to provide addressable persistent storage for data signals.

Figure 5:
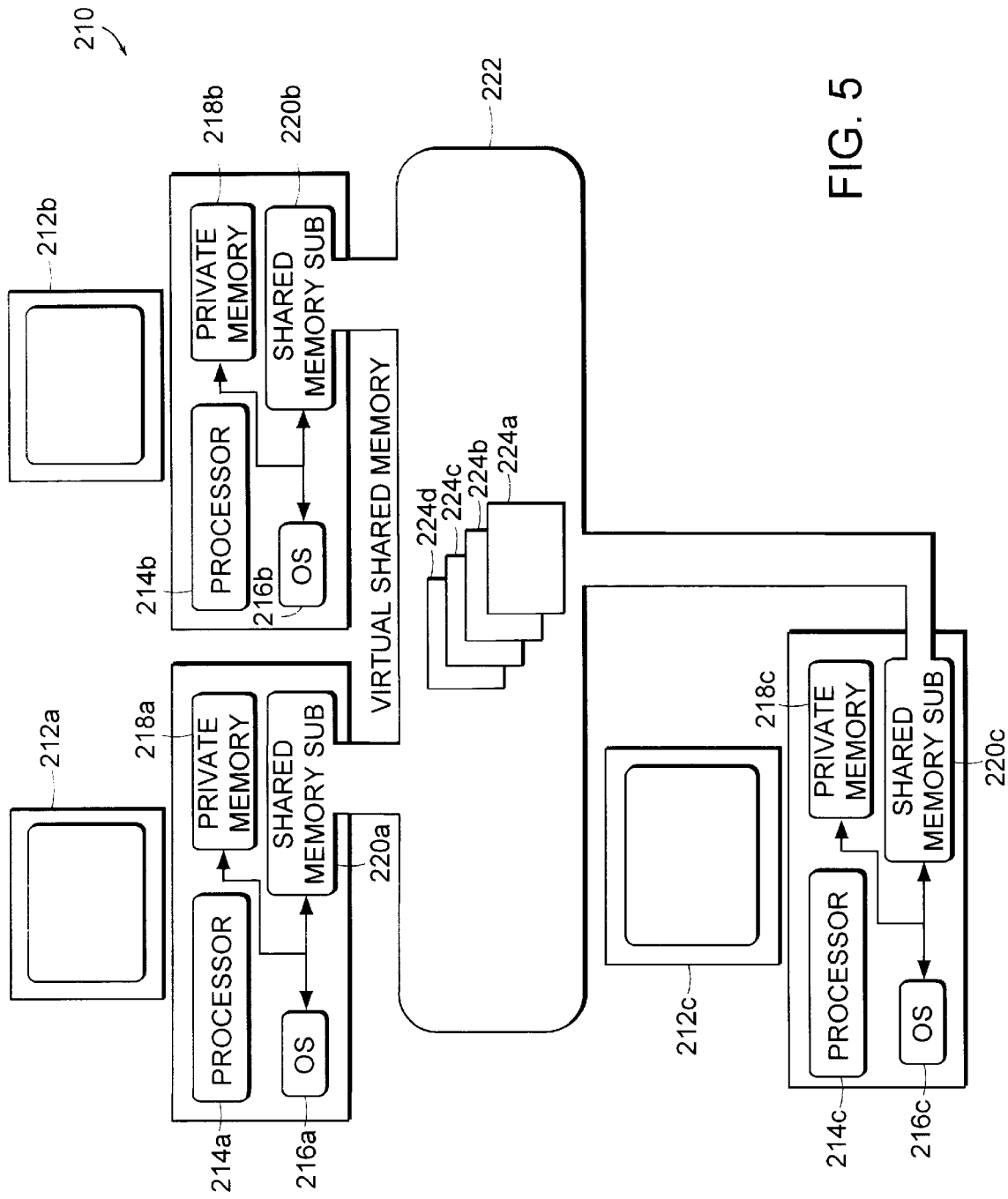
FIG. 5 illustrates a distributed shared memory computer network.

Turning now to the drawings related to the addressable shared memory system or engine of the above-identified, incorporated-by-reference U.S. patent application, FIG. 5 illustrates a computer network 10 that provides a shared memory that spans the memory space of each node of the depicted computer network 210.

Specifically, FIG. 5 illustrates a computer network 210 that includes a plurality of nodes 212a–212c, each having a CPU 214, an operating system 216, an optional private memory device 218, and a shared memory subsystem 220. As further depicted in by FIG. 5, each node 212a–212c connects via the shared memory subsystem 220 to a virtual shared memory 222. As will be explained in greater detail hereinafter, by providing the shared memory subsystem 220 that allows the node 212a–212c to access the virtual shared memory 222, the computer network 210 enables network nodes 212a–212c to communicate and share functionality using the same techniques employed by applications when communicating between applications running on the same machine. These techniques can employ object linking and embedding, dynamic link libraries, class registering, and other such techniques. Accordingly, the nodes 212 can employ the virtual shared memory 222 to exchange data and objects between application programs running on the different nodes 212 of the network 210.

In the embodiment depicted in FIG. 5, each node 212 can be a conventional computer system such as a commercially available IBM PC compatible computer system. The processor 214 can be any processor unit suitable for performing the data processing for that computer system. The operating system 216 can be any commercially available or proprietary operating system that includes, or can access, functions for accessing the local memory of the computer system and networking.

The private memory device 218 can be any computer memory device suitable for storing data signals representative of computer readable information. The private memory provides the node with local storage that can be kept inaccessible to the other nodes on the network. Typically the private memory device 218 includes a RAM, or a portion of a RAM memory, for temporarily storing data and application programs and for providing the processor 214 with memory storage for executing programs. The private memory device 18 can also include persistent memory storage, typically a hard disk unit or a portion of a hard disk unit, for the persistent storage of data.

The shared memory subsystem 220 depicted in FIG. 5 couples between the operating system 216 and the virtual shared memory 222 and forms an interface between the operating system 216 and the virtual shared memory to allow the operating system 216 to access the virtual shared memory 222. The depicted shared memory subsystem 220 is a software module that operates as a stand-alone distributed shared memory engine. The depicted system is illustrative and other systems of the invention can be realized as shared memory subsystems that can be embedded into an application program, or be implemented as an embedded code of a hardware device. Other such applications can be practiced without departing from the scope of the invention.

The depicted virtual shared memory 222 illustrates a virtual shared memory that is accessible by each of the nodes 212a–212c via the shared memory subsystem 220. The virtual shared memory 222 can map to devices that provide physical storage for computer readable data, depicted in FIG. 5 as a plurality of pages 224a–224d. In one embodiment, the pages form portions of the shared memory space and divide the address space of the shared memory into page addressable memory spaces. For example the address space can be paged into 4K byte sections. In other embodiments alternative granularity can be employed to manage the shared memory space. Each node 212a–212c through the shared memory subsystem 220 can access each page 224a–224d stored in the virtual shared memory 222. Each page 224a–224d represents a unique entry of computer data stored within the virtual shared memory 222. Each page 224a–224d is accessible to each one of the nodes 212a–212c, and alternatively, each node can store additional pages of data within the virtual shared memory 222. Each newly stored page of data can be accessible to each of the other nodes 212a–212c. Accordingly, the virtual shared memory 222 provides a system for sharing and communicating data between each node 212 of the computer network 210.

Figure 6:
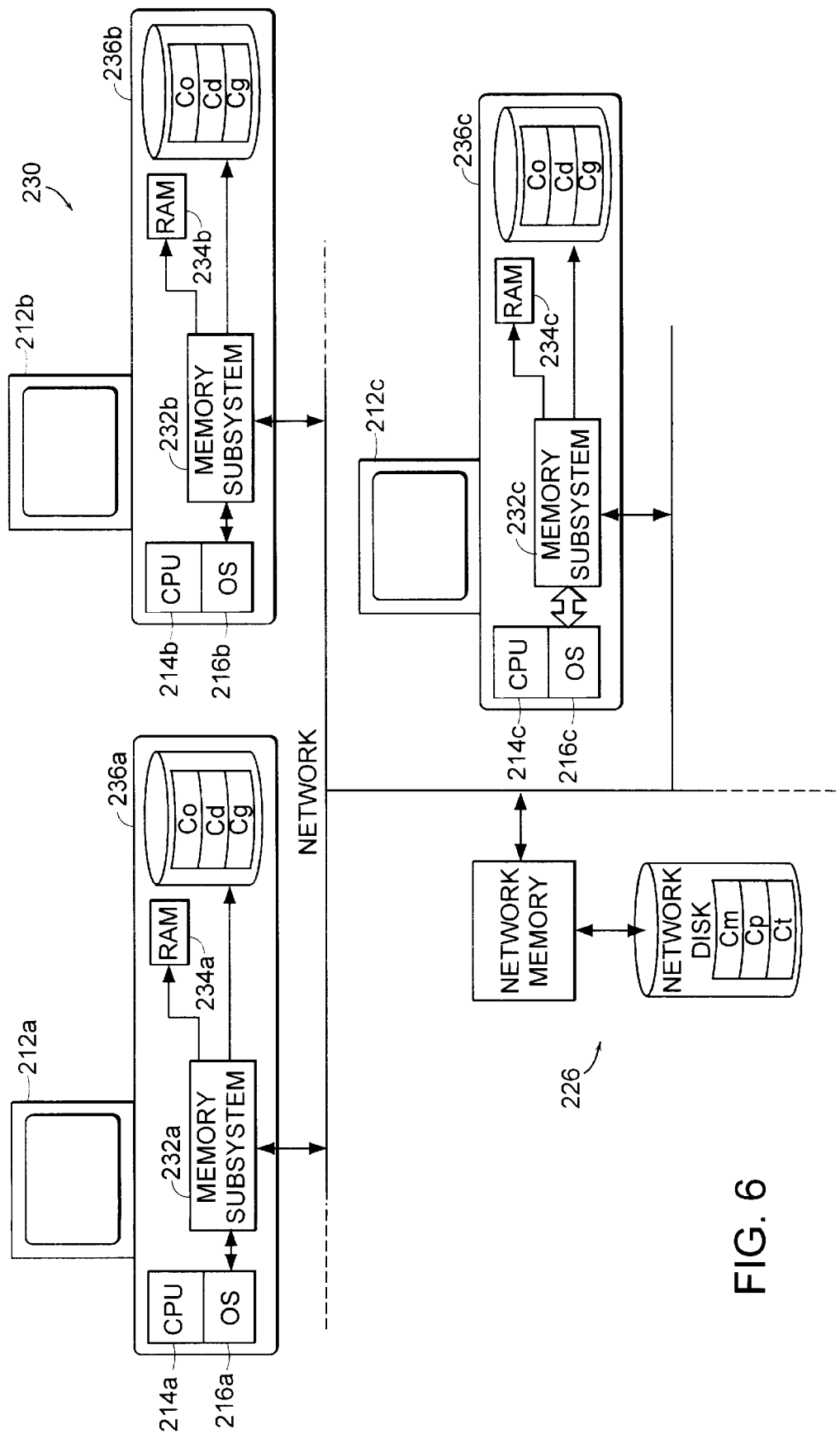
FIG. 6 is a functional block diagram that illustrates in more detail one distributed shared memory computer network of the type shown in FIG. 5.

FIG. 6 illustrates in functional block diagram form a computer network 230 that has a distributed shared memory. In this embodiment, each node 212a–212c has a memory subsystem 232 that connects between the operating system 216 and the two local memory devices, the RAM 234 and the disk 236, and that further couples to a network 238 that couples to each of the depicted nodes 212a, 212b and 212c and to a network memory device 226.

More particularly, FIG. 6 illustrates a distributed shared memory network 30 that includes a plurality of nodes 212a–212c, each including a processing unit 214, an operating system 216, a memory subsystem 232, a RAM 234, and a disk 236. FIG. 6 further depicts a computer network system 38 that connects between the nodes 212a–212c and the network memory device 226. The network 238 provides a network communication system across these elements.

The illustrated memory subsystems 232a–232c that connect between the operating system 216a–216c, the memory elements 234a–234c, 236a–236c, and the network 238, encapsulate the local memories of each of the nodes to provide an abstraction of a shared virtual memory system that spans across each of the nodes 212a–212c on the network 238. The memory subsystems 232a–232c can be software modules that act as distributors to map portions of the addressable memory space across the depicted memory devices. The memory subsystems further track the data stored in the local memory of each node 212 and further operate network connections with network 238 for transferring data between the nodes 212a–212c. In this way, the memory subsystems 232a–232c access and control each memory element on the network 238 to perform memory access operations that are transparent to the operating system 216. Accordingly, the operating system 216 interfaces with the memory subsystem 232 as an interface to a global memory space that spans each node 212a–212c on the network 238.

FIG. 6 further depicts that the system 230 provides a distributed shared memory that includes persistent storage for portions of the distributed memory. In particular, the depicted embodiment includes a memory subsystem, such as subsystem 232a, that interfaces to a persistent memory device, depicted as the disk 236a. The subsystem 232a can operate the persistent memory device to provide persistent storage for portions of the distributed shared memory space. As illustrated, each persistent memory device 236 depicted in FIG. 6 has a portion of the addressable memory space mapped onto it. For example, device 236a has the portions of the addressable memory space, $C_o$, $C_d$, $C_g$, mapped onto it, and provides persistent storage for data signals stored in those ranges of addresses.

Accordingly, the subsystem 232a can provide integrated control of persistent storage devices and electronic memory to allow the distributed shared memory space to span across both types of storage devices, and to allow portions of the distributed shared memory to move between persistent and electronic memory depending on predetermined conditions, such as recent usage.

In one optional embodiment, the nodes of the network are organized into a hierarchy of groups. In this embodiment, the memory subsystems 232a–232c can include a hierarchy manager that provides hierarchical control for the distribution of data. This includes controlling the migration controller, and policy controller, which are discussed in detail below, to perform hierarchical data migration and load balancing, such that data migrates primarily between computers of the same group, and passes to other groups in hierarchical order. Resource distribution is similarly managed.

Figure 7:
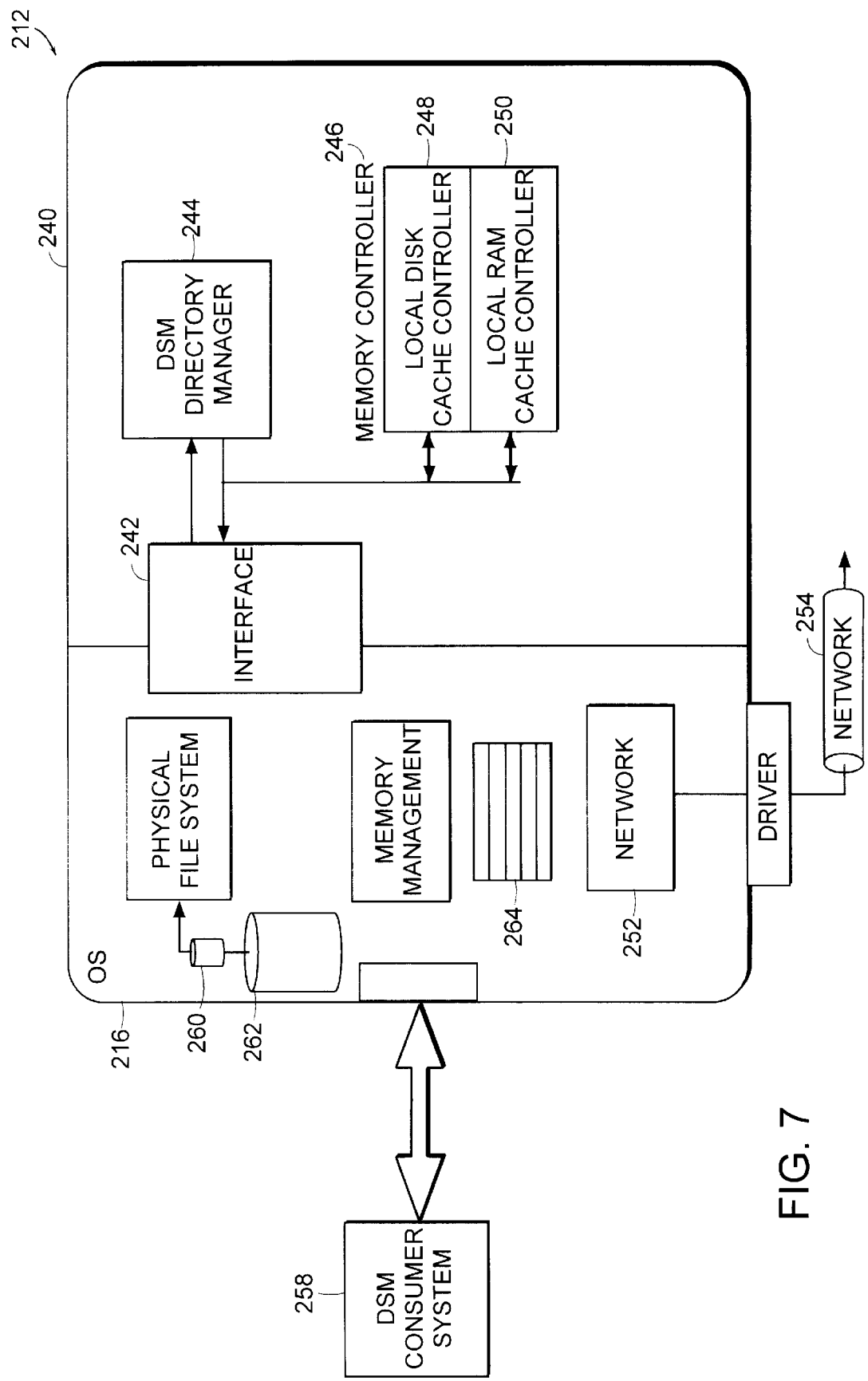
FIG. 7 illustrates in more detail a shared memory subsystem suitable for practice with the network illustrated in FIG. 6.

FIG. 7 illustrates in more detail one shared memory subsystem 240. FIG. 7 depicts a shared memory subsystem 240, that includes an interface 242, a DSM directory manager 244, a memory controller 246, a local disk cache controller 248, and a local RAM cache controller 250. FIG. 7 further depicts the network 254, an optional consumer of the DSM system, depicted as the service 258, the operating system 216, a disk driver 260, a disk element 262 and a RAM element 264.

The shared memory subsystem 240 depicted in FIG. 7 can encapsulate the memory management operations of the network node 212 to provide a virtual shared memory that can span across each node that connects into the network 254. Accordingly, each local node 212 views the network as a set of nodes that are each connected to a large shared computer memory.

The depicted interface 242 provides an entry point for the local node to access the shared memory space of the computer network. The interface 242 can couple directly to the operating system 216, to a distributed service utility such as the depicted DSM file system 258, to a distributed user-level service utility, or alternatively to any combination thereof The depicted interface 242 provides an API that is a memory oriented API. Thus, the illustrated interface 242 can export a set of interfaces that provide low-level control of the distributed memory. As illustrated in FIG. 7, the interface 242 exports the API to the operating system 216 or to the optional DSM service 258. The operating system 216 or the service employs the interface 242 to request standard memory management techniques, such as reading and writing from portions of the memory space. These portions of the memory space can be the pages as described above which can be 4K byte portions of the shared memory space, or other units of memory, such as objects or segments. Each page can be located within the shared memory space which is designated by a global address signal for that page of memory. The system can receive address signals from an application program or, optionally, can include a global address generator that generates the address signals. The address generator can include a spanning module that generates address signals for a memory space that spans the storage capacity of the network.

Accordingly, in one embodiment, the interface 242 receives requests to manipulate pages of the shared memory space. To this end, the interface 242 can comprise a software module that includes a library of functions that can be called by services, the OS 216, or other caller, or device. The function calls provide the OS 216 with an API of high level memory oriented services, such as read data, write data, and allocate memory. The implementation of the functions can include a set of calls to controls that operate the directory manager 244, and the local memory controller 246. Accordingly, the interface 242 can be a set of high level memory function calls to interface to the low-level functional elements of shared memory subsystem 240.

FIG. 7 further depicts a DSM directory manager 244 that couples to the interface 242. The interface 242 passes request signals that represent requests to implement memory operations such as allocating a portion of memory, locking a portion of memory, mapping a portion of memory, or some other such memory function. The directory manager 244 manages a directory that can include mappings than can span across each memory device connected to the network 238 depicted in FIG. 6, including each RAM and disk element accessible by the network. The directory manager 244 stores a global directory structure that provides a map of the global address space. In one embodiment as will be explained in greater detail hereinafter, the directory manager 244 provides a global directory that maps between global address signals and responsible nodes on the network. A responsible node stores information regarding the location and attributes of data associated with a respective global address, and optionally stores a copy of that page's data. Consequently, the directory manager 244 tracks information for accessing any address location within the identifier space.

The control of the distributed shared memory can be coordinated by the directory manager 244 and the memory controller 246. The directory manager 244 maintains a directory structure that can operate on a global address received from the interface 242 and identify, for that address, a node on the network that is responsible for maintaining the page associated with that address of the shared memory space. Once the directory manager 244 identifies which node is responsible for maintaining a particular address, the directory manager 244 can identify a node that stores information for locating a copy of the page, and make the call to the memory controller 246 of that node and pass to that node's memory controller the memory request provided by the memory interface 242. Accordingly, the depicted directory manager 244 is responsible for managing a directory structure that identifies for each page of the shared memory space a responsible node that tracks the physical location of the data stored in the respective page. Thus, the directory, rather than directly providing the location of the page, can optionally identify a responsible node, or other device, that tracks the location of the page. This indirection facilitates maintenance of the directory as pages migrate between nodes.

The memory controller 246 performs the low level memory access functions that physically store data within the memory elements connected to the network. In the depicted embodiment, the directory manager 244 of a first node can pass a memory access request through the interface 242, to the network module of the OS 216, and across the network 254 to a second node that the directory manager 244 identifies as the responsible node for the given address. The directory manager 244 can then query the responsible node to determine the attributes and the current owner node of the memory page that is associated with the respective global address. The owner of the respective page is the network node that has control over the memory storage element on which the data of the associated page is stored. The memory controller 246 of the owner can access, through the OS 216 of that node or through any interface, the memory of the owner node to access the data of the page that is physically stored on that owner node.

In particular, as depicted in FIG. 7, the directory manager 244 couples to the network module 252 which couples to the network 254. The directory manager can transmit to the network module 252 a command and associated data that directs the network interface 252 to pass a data signal to the owner node. The owner node receives the memory request across network 254 and through network module 252 that passes the memory request to the interface 242 of that owner node. The interface 242 couples to the memory controller 246 and can pass the memory request to the local memory controller of that owner node for operating the local storage elements, such as the disk or RAM elements, to perform the requested memory operation.

Once the owner node has performed the requested memory operation, such as reading a page of data, the memory subsystem 240 of the owner node can then transfer the page of data, or a copy of the page of data, via the network 254 to the node that originally requested access to that portion of the shared memory. The page of data is transferred via the network 254 to the network module 252 of the requesting node and the shared memory subsystem 240 operates the memory controller 246 to store in the local memory of the requesting node a copy of the accessed data.

Accordingly, in one embodiment, when a first node accesses a page of the shared memory space which is not stored locally on that node, the directory manager 244 identifies a node that has a copy of the data stored in that page and moves a copy of that data into the local memory of the requesting node. The local memory storage, both volatile and persistent, of the requesting node therefore becomes a cache for pages that have been requested by that local node. This embodiment is depicted FIG. 7 which depicts a memory controller that has a local disk cache controller 248 and a local RAM cache controller 250. Both of these local cache controllers can provide to the operating system 216, or other consumer pages of the shared memory space that are cache stored in the local memory of the node, including local persistent memory and local volatile memory.

The shared memory subsystem can include a coherent replication controller that maintains coherency between cached pages by employing a coherence through invalidation process, a coherence through migration process, or other suitable coherence process. The coherent replication controller can automatically generate a copy of the data stored in each page and can store the copy in a memory device that is separate from the memory device of the original copy. This provides for fault tolerant operation, as the failure of any one memory device will not result in the loss of data. The coherent replication controller can be a software model that monitors all copies of pages kept in volatile memory and made available for writing. The controller can employ any of the coherency techniques named above, and can store tables of location information that identifies the location information for all generated copies.

Figure 8:
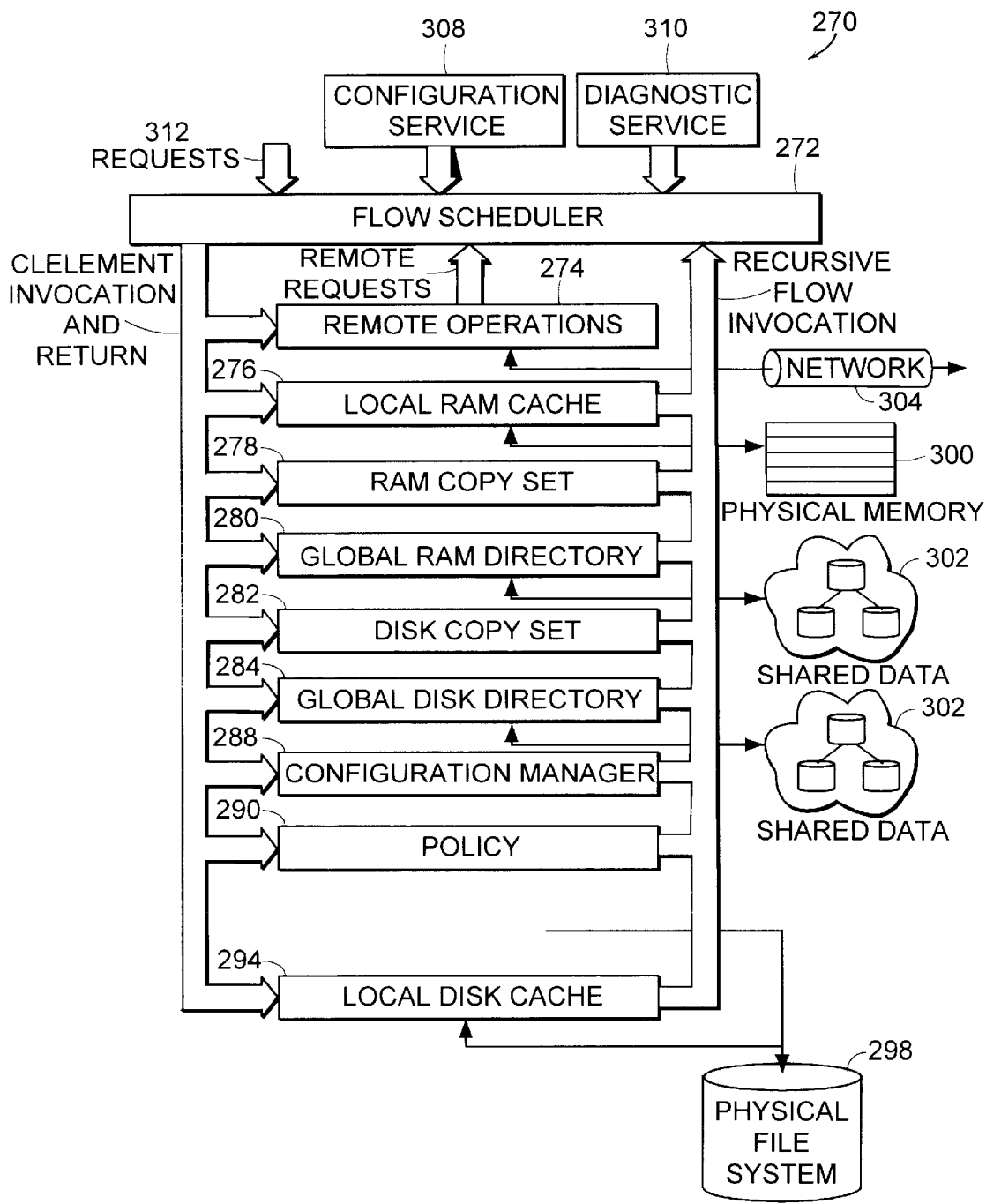
FIG. 8 is a functional block diagram of one shared memory subsystem.

FIG. 8 illustrates in greater detail one embodiment of a shared memory subsystem. The shared memory subsystem 270 depicted in FIG. 8 includes a remote operations element 274, a local RAM cache 276, a RAM copyset 278, a global RAM directory 280, a disk copyset 282, a global disk directory 284, a configuration manager 288, a policy element 290, and a local disk cache 94. FIG. 8 further depicts a network element 304, a physical memory 300, shared data element 302, a physical file system 298, which is part of the operating system 216, a configuration service 308, a diagnostic service 310, and a memory access request 312. The depicted subsystem 270 can be a computer program that couples to the physical memory, file system, and network system of the host node, or can be electrical circuit card assemblies that interface to the host node, or can be a combination of programs and circuit card assemblies.

The flow scheduler 272 depicted in FIG. 8 can orchestrate the controls provided by an API of the subsystem 270. In one embodiment, the flow scheduler 272 can be a state machine that monitors and responds to the requests 312 and remote requests through network 304 which can be instructions for memory operations and which can include signals representative of the global addresses being operated on. These memory operation requests 312 can act as op-codes for primitive operations on one or more global addresses. They can be read and write requests, or other memory operations. Alternatively, the flow scheduler 272 can be a program, such as an interpreter, that provides an execution environment and can map these op-codes into control flow programs called applets. The applets can be independent executable programs that employ both environment services, such as threading, synchronization, and buffer management, and the elements depicted in FIG. 8. The API is capable of being called from both external clients, like a distributed shared memory file system, as well as recursively by the applets and the other elements 274–294 of the subsystem 270. Each element can provide a level of encapsulation to the management of a particular resource or aspect of the system. To this end, each element can export an API consisting of functions to be employed by the applets. This structure is illustrated in FIG. 8. Accordingly, the flow scheduler 272 can provide an environment to load and execute applets. The applets are dispatched by the flow scheduler 272 on a per op-code basis and can perform the control flow for sequential or parallel execution of an element to implement the op-code on the specified global address, such as a read or write operation. Optionally, the flow scheduler 272 can include an element to change dynamically the applet at run time as well as execute applets in parallel and in interpreted mode.

The depicted shared memory subsystem 270 includes a bifurcated directory manager that includes the global RAM directory 280 and the global disk directory 284.

The global RAM directory 280 is a directory manager that tracks information that can provide the location of pages that are stored in the volatile memory, typically RAM, of the network nodes. The global disk directory 284 is a global disk directory manager that manages a directory structure that tracks information that can provide the location of pages that are stored on persistent memory devices. Together, the global RAM directory 280 and the global disk directory 284 provide the shared memory subsystem 270 with integrated directory management for pages that are stored in persistent storage and volatile memory.

In one embodiment a paging element can operate the RAM and disk directory managers to remap portions of the addressable memory space between one of the volatile memories and one of the persistent memories. In the shared memory system, this allows the paging element to remap pages from the volatile memory of one node to a disk memory of another node. Accordingly, the RAM directory manager passes control of that page to the disk directory manager which can then treat the page as any other page of data. This allows for improved load balancing, by removing data from RAM memory, and storing it in the disk devices, under the control of the disk directory manager.

The local memory controller of the subsystem 270 is provided by the local RAM cache 276 and the local disk cache 294. The local RAM cache 276 which couples to the physical memory 300 of the local node can access, as described above, the virtual memory space of the local node to access data that is physically stored within the RAM memory 300. Similarly, the local disk cache 294 couples to the persistent storage device 298 and can access a physical location that maintains in the local persistent storage data of the distributed shared memory.

FIG. 8 also depicts a remote operations element 274 that couples between the network 304 and the flow scheduler 272. The remote operations element 274 negotiates the transfer of data across the network 304 for moving portions of the data stored in the shared memory space between the nodes of the network. The remote operations element 274 can also request services from remote peers, i.e. invalidate to help maintain coherency or for other reasons.

FIG. 8 also depicts a policy element 290 that can be a software module that acts as a controller to determine the availability of resources, such as printer capabilities, hard-disk space, available RAM and other such resources. The policy controller can employ any of the suitable heuristics to direct the elements, such as the paging controller, disk directory manager, and other elements to dynamically distribute the available resources.

FIG. 8 further depicts a memory subsystem 270 that includes a RAM copyset 278 and a disk copyset 282. These copysets can manage copies of pages that are cached at a single node. The disk copyset 282 can maintain information on copies of pages that are stored in the local disk cache, which can be the local persistent memory. Similarly, the RAM copyset 278 can maintain information on copies of pages that are stored in the local RAM cache which can be the local RAM. These copysets encapsulate indexing and storage of copyset data that can be employed by applets or other executing code for purposes of maintaining the coherency of data stored in the shared memory space. The copyset elements can maintain copyset data that identifies the pages cached by the host node. Further, the copyset can identify the other nodes on the network that maintain a copy of that page, and can further identify for each page which of these nodes is the owner node, wherein the owner node can be a node which has write privileges to the page being accessed. The copysets themselves can be stored in pages of the distributed shared memory space.

The local RAM cache 276 provides storage for memory pages and their attributes. In one embodiment, the local RAM cache 276 provides a global address index for accessing the cached pages of the distributed memory and the attributes based on that page. In this embodiment, the local ram cache 276 provides the index by storing in memory a list of each global address cached in the local RAM. With each listed global address, the index provides a pointer into a buffer memory and to the location of the page data. Optionally, with each listed global address, the index can further provide attribute information including a version tag representative of the version of the data, a dirty bit representative of whether the RAM cached data is a copy of the data held on disk, or whether the RAM cached data has been modified but not yet flushed to disk, a volatile bit to indicate if the page is backed by backing store in persistent memory, and other such attribute information useful for managing the coherency of the stored data.

In the embodiment depicted in FIG. 8, the memory subsystem 270 provides the node access to the distributed memory space by the coordinated operation of the directory manager that includes the global RAM directory 280 and the global disk directory 284, the cache controller that includes the local RAM cache and the local disk cache elements 276 and 294, and the copyset elements which include the RAM copyset 278 and the disk copyset 282.

The directory manager provides a directory structure that indexes the shared address space. Continuing with the example of a paged shared address space, the directory manager of the subsystem 270 allows the host node to access, by global addresses, pages of the shared memory space.

Figure 9:
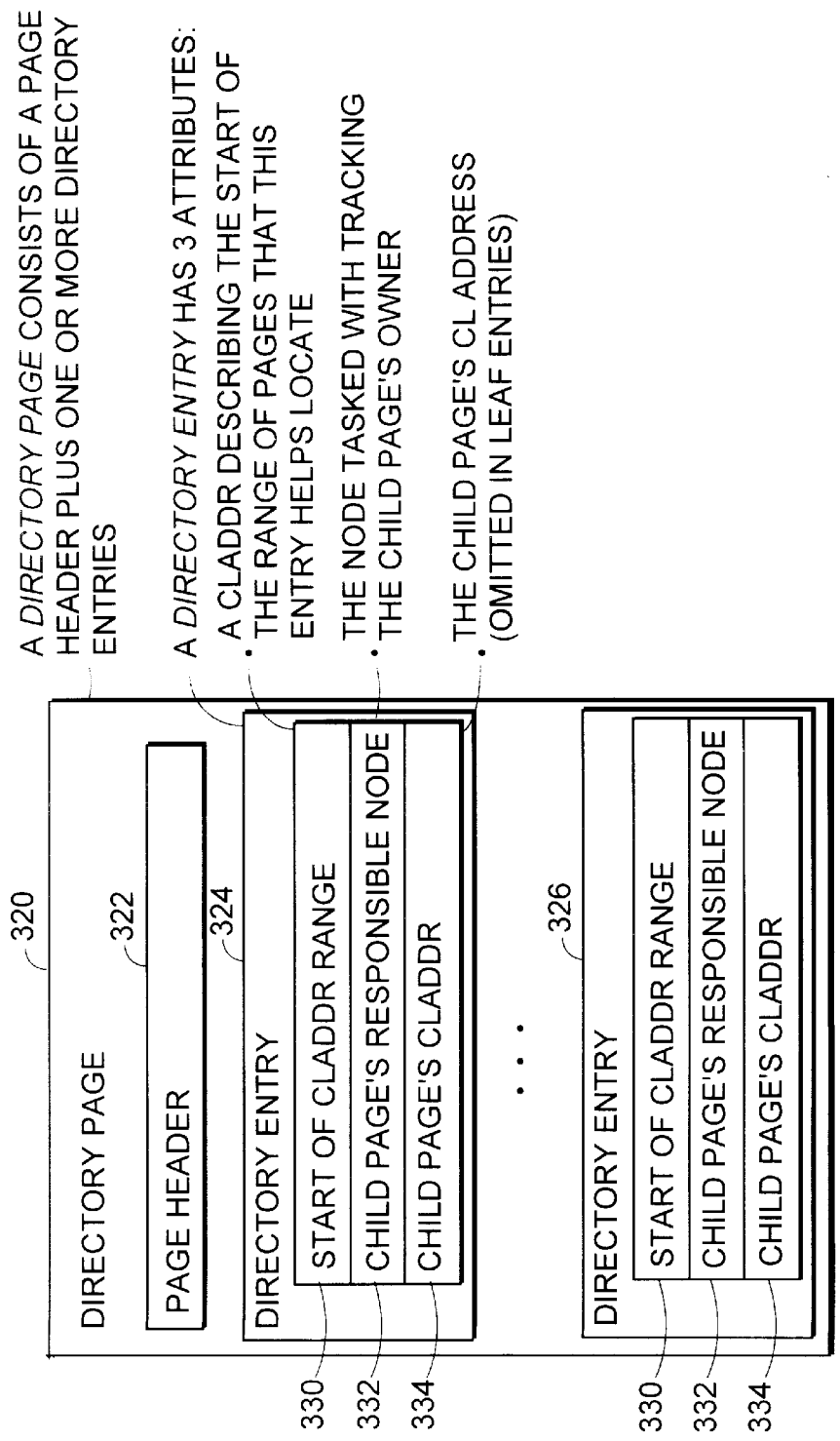
FIG. 9 illustrates a directory page that can be provided by a shared memory subsystem of the type depicted in FIG. 8.
Figure 10:
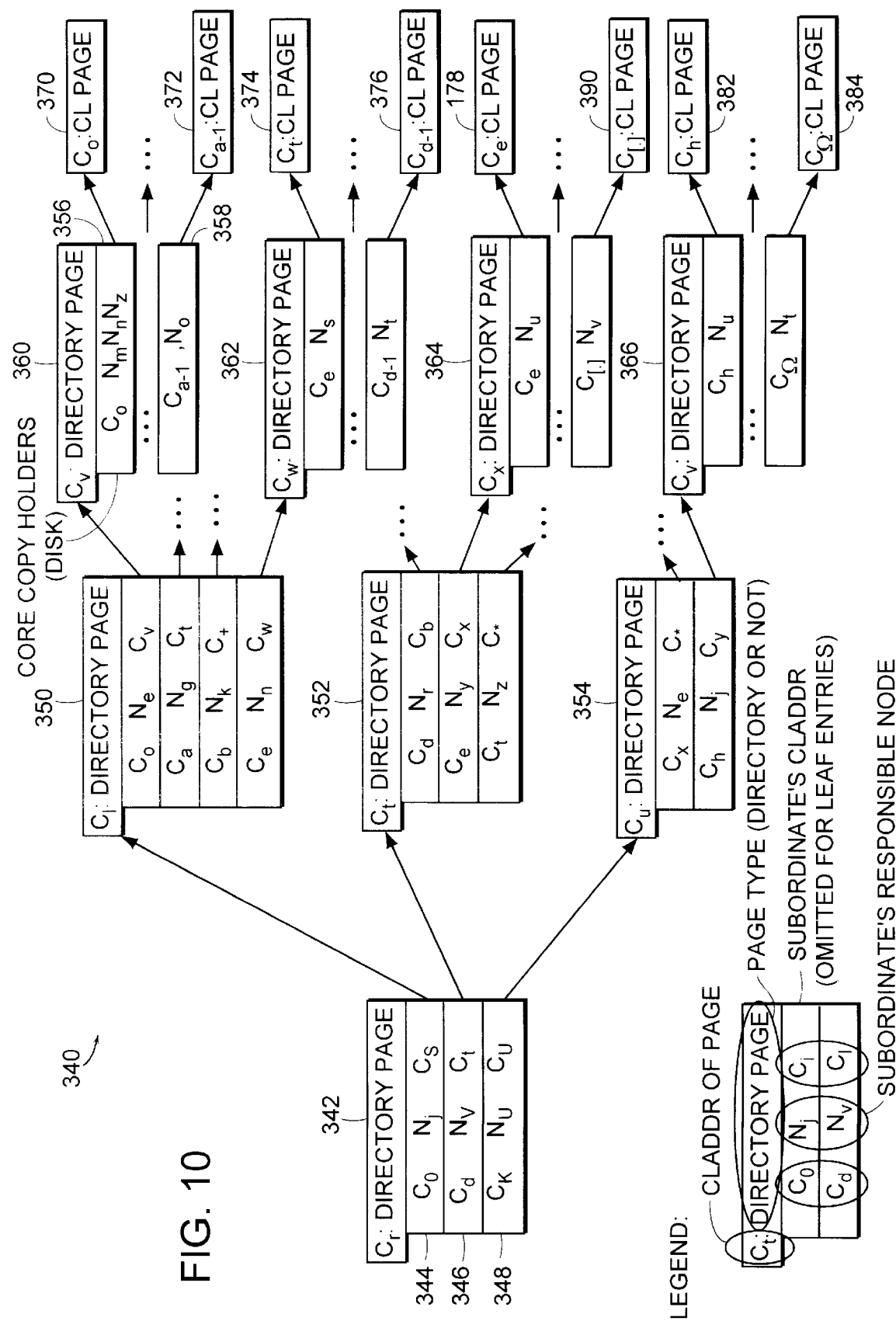
FIG. 10 illustrates a directory that can be distributed within a shared memory and formed of directory pages of the type illustrated in FIG. 9.

FIGS. 9 and 10 illustrate one example of a directory structure that provides access to the shared memory space. FIG. 9 depicts a directory page 320 that includes a page header 322, directory entries 324 and 326, wherein each directory entry includes a range field 330, a responsible node field 332, and an address field 334. The directory pages can be generated by a directory page generator that can be a software module controlled by the directory manager. It will be understood that the directory manager can generate multiple directories, including one for the Global disk and one for the Global RAM directories. The depicted directory page 320 can be a page of the global address space, such as a 4K byte portion of the shared address space. Therefore, the directory page can be stored in the distributed shared memory space just as the other pages to which the directory pages provide access.

As further depicted in FIG. 9, each directory page 120 includes a page header 322 that includes attribute information for that page header, which is typically metadata for the directory page, and further includes directory entries such as the depicted directory entries, 324 and 326, which provide an index into a portion of the shared address space wherein that portion can be one or more pages, including all the pages of the distributed shared memory space. The depicted directory page 320 includes directory entries that index a selected range of global addresses of the shared memory space. To this end, the directory generator can include a range generator so that each directory entry can include a range field 330 that describes the start of a range of addresses that entry locates.

Accordingly, each directory page 320 can include a plurality of directory entries, such as entries 324 and 326, that can subdivide the address space into a subset of address ranges. For example, the depicted directory page 320 includes two directory entries 324 and 326. The directory entries 324 and 326 can, for example, subdivide the address space into two sub-portions. In this example, the start address range of the directory entry 324 could be the base address of the address space, and the start address range of the directory entry 326 could be the address for the upper half of the memory space. Accordingly, the directory entry 324 provides an index for pages stored in the address space between the base address and up to the mid-point of the memory space and, in complement thereto, the directory entry 326 provides an index to pages stored in the address space that ranges from the mid-point of the address space to the highest address.

FIG. 9 further depicts a directory page 320 that includes, in each directory entry, a responsible node field 332 and the child page global address field 334. These fields 332, 334 provide further location information for the data stored in pages within the address range identified in field 330.

FIG. 10 depicts a directory 340 formed from directory pages similar to those depicted in FIG. 9. FIG. 10 depicts that the directory 340 includes directory pages 342, 350–354, and 360–366. FIG. 10 further depicts that the directory 340 provides location information to the pages of the distributed shared memory space depicted in FIG. 10 as pages 370–384.

The directory page 342 depicted in FIG. 10 acts like a root directory page and can be located at a static address that is known to each node coupled to the distributed address space. The root directory page 342 includes three directory entries 344, 346, and 348. Each directory entry depicted in FIG. 10 has directory entries similar to those depicted in FIG. 9. For example, directory entry 344 includes a variable Co which represents the address range field 330, a variable Nj representative of the field 332, and a variable Cs representative of the field 334. The depicted root directory page 342 subdivides the address space into three ranges illustrated as an address range that extends between the address Co and Cd, a second address range that extends between the address Cd and Cg, and a third address range that extends between Cg and the highest memory location of the address space.

As further depicted in FIG. 10, each directory entry 344, 346, and 348 points to a subordinate directory page, depicted as directory pages 350, 352, and 354, each of which further subdivides the address range index by the associated directory entry of the root directory 342. In FIG. 9, this subdivision process continues as each of the directory pages 350, 352, and 354 each again have directory entries that locate subordinate directory pages including the depicted examples of directory pages 360, 362, 364, and 366.

The depicted example of directory pages 360, 362, 364, and 366 are each leaf entries. The leaf entries contain directory entries such as the directory entries 356 and 358 of the leaf entry 360, that store a range field 330 and the responsible node field 332. These leaf entries identify an address and a responsible node for the page in the distributed memory space that is being accessed, such as the depicted pages 370–384. For example, as depicted in FIG. 10, the leaf entry 356 points to the page 370 that corresponds to the range field 330 of the leaf entry 356, which for a leaf entry is the page being accessed. In this way, the directory structure 340 provides location information for pages stored in the distributed address space.

In the depicted embodiment of FIG. 10, a node selector can select a responsible node for each page, as described above, so that the leaf entry 356 provides information of the address and responsible node of the page being located. Accordingly, this directory tracks ownership and responsibility for data, to provide a level of indirection between the directory and the physical location of the data. During a memory access operation, the memory subsystem 270 passes to the responsible node indicated in the leaf entry 356 the address of the page being accessed. The shared memory subsystem of that node can identify a node that stores a copy of the page being accessed, including the owner node. This identification of a node having a copy can be performed by the RAM copyset or disk copyset of the responsible node. The node having a copy stored in its local physical memory, such as the owner node, can employ its local cache elements, including the local RAM cache and local disk cache to the identify from the global address signal a physical location of the data stored in the page being accessed. The cache element can employ the operating system of the owner node to access the memory device that maintains that physical location in order that the data stored in the page can be accessed. For a read-memory operation, or for other similar operations, the data read from the physical memory of the owner node can be passed via the network to the memory subsystem of the node requesting the read and subsequently stored into the virtual memory space of the requesting node for use by that node.

With reference again to FIG. 10, it can be seen that the depicted directory structure 340 comprises a hierarchical structure. To this end, the directory structure 340 provides a structure that continually subdivides the memory space into smaller and smaller sections. Further, each section is represented by directory pages of the same structure, but indexes address spaces of different sizes. As pages are created or deleted, a linker inserts or deletes the pages from the directory. In one embodiment, the linker is a software module for linking data structures. The linker can operate responsive to the address ranges to provide the depicted hierarchical structure. Accordingly, the depicted directory 340 provides a scaleable directory for the shared address space. Moreover, the directory pages are stored in the distributed address space and maintained by the distributed shared memory system. A root for the directory can be stored in known locations to allow for bootstrap of the system. Consequently, commonly used pages are copied and distributed, and rarely used pages are shuffled off to disk. Similarly, directory pages will migrate to those nodes that access them most, providing a degree of self-organization that reduces network traffic.

Figure 11:
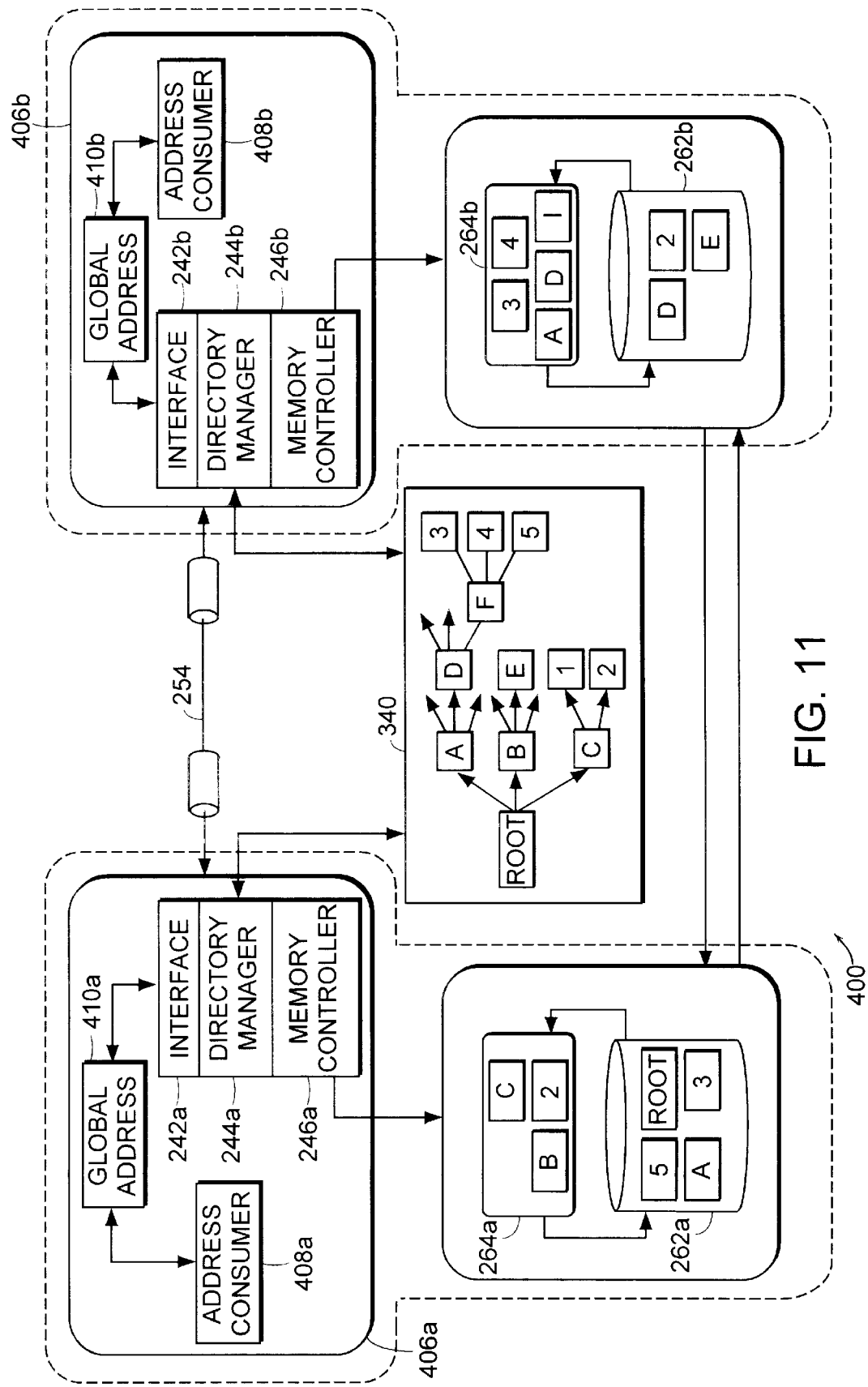
FIG. 11 is a functional block diagram of a system that employs a directory according to FIG. 10 for tracking portions of a distributed shared memory.

FIG. 11 depicts the directory of FIG. 10 being employed by a system. In particular, FIG. 11 depicts a system 400 that includes two nodes, 406a and 406b, a directory structure 340, and a pair of local memories having volatile memory devices 264a and 264b, and persistent memory devices 262a and 262b. Depicted node 406a includes an address consumer 408a, a global address 410a, and interface 242a, a directory manager 244a and a memory controller 246a. Node 406b has corresponding elements. The nodes are connected by the network 254. The directory 340 has a root page, directory pages A–F, and pages 1–5.

Each node 406a and 406b operates as discussed above. The depicted address consumers 408a and 408b can be an application program, file system, hardware device or any other such element that requests access to the virtual memory. In operation, the address consumers 408a and 408b request an address, or range of addresses, and the directory manager can include a global address generator that provides the consumer with the requested address, or a pointer to the requested address. As addresses get generated, the respective directory managers 244a and 244b generate directory pages and store the pages in the directory structure 340. As depicted, the directory structure 340 tracks the portions of the address space being employed by the system 400, and physical storage for each page is provided within the local memories.

As shown in FIG. 11, the data associated with the directory pages are distributively stored across the two local memories and duplicate copies can exist. As described above and now illustrated in FIG. 11, the data can move between different local memories and also move, or page, between volatile and persistent storage. The data movement can be responsive to data requests made by memory users like application programs, or by operation of the migration controller described above. As also described above, the movement of data between different memory locations can occur without requiring changes to the directory 340. This is achieved by providing a directory 340 that is decoupled from the physical location of the data by employing a pointer to a responsible node that tracks the data storage location. Accordingly, although the data storage location can change, the responsible node can remain constant, thereby avoiding any need to change the directory 340.

DISTRIBUTED WORKGROUPS

Having described in some detail structured data storage systems and the addressable shared memory system employed by such systems, a description of the present invention is now provided under this heading.

Overview

The invention provides a peer-to-peer network that spans WANs. The invention spans multiple nodes, some of which may be separated from one another by relatively unstable, low bandwidth links (e.g., modems or WANs). In its simplest form, the invention might span a collection of nodes on a LAN and a single remote access computer such as a portable computer connected to the LAN via a modem. An alternative form might include nodes on two or more LANs in different buildings sharing some set of files. For example, a folder could be shared between a group of architects and an engineering consulting group cooperating on the design of a building. Some differences between the invention and the base version of the technology described hereinabove include the existence of slow communication links, a much higher likelihood of network partitions, nodes in separately administered security domains, and nodes in separate clouds. A "cloud" is a collection of networked computers interoperating to implement the huge virtual space and global storage scheme described in detail hereinabove. In general, a cloud includes nodes on the same network (e.g., LAN), and two clouds (e.g., two LANs) can be interconnected and interoperated according to this invention, although it is possible to think of two or more interconnected networks as defining a single cloud that spans all interconnected networks.

The basic premise behind the invention can be summarized in the following two paragraphs.

Data pages shared between multiple clouds (or a LAN cloud and a roaming or remote access computer) have the same addresses on both sides of the link such that pages can freely migrate between clouds or be replicated on multiple clouds as appropriate.

Metadata pages are not shared between clouds. Instead of using the shared address space to maintain consistency of data structures between the clouds, each cloud maintains its own copy of each data structure and uses proxy techniques to keep the different data structures consistent. A protocol involves a "proxy" when a node in one cloud cannot directly manipulate all versions of a "global" data structure, but must instead send a request to a node in a remote cloud, the proxy node, and ask the proxy node to perform an operation on its behalf. For example, rather than directly manipulate a remote cloud's global disk directory, GDD, a node will send a request to a member of that cloud and ask it to perform the desired operation. Proxy operations typically will be performed via remote procedure calls (RPCs). Put another way, the metadata structures are partitioned. The data structures affected include the global disk directory (GDD, FIG. 8), global RAM directory (GRD, FIG. 8), and the RAM copyset structures (FIG. 8). Although these data structures are not shared between clouds, they are coordinated to maintain the same consistency and fault tolerance guarantees present in the base version of the technology described hereinabove. For example, although the GDD pages in each cloud are independent, the leaf nodes in each GDD that store disk core copy set information can include "virtual" entries that refer to core copies in remote clouds. The GRD and RAM copy set structures can include similar "virtual" entries. The structure of these virtual entries and the proxy mechanisms used to keep them consistent are described below.

For completeness and by way of definition, a core copy is a copy of a shared page stored on a persistent storage device (e.g., local hard disk of one of the network nodes) that is updated whenever the contents of that page are modified by any network node.

The invention is designed for use with a structured data storage system such as the file system described hereinabove. The invention, at the component level, is comprised of: (1) a set of Policies that deal with controlling inter-cloud behavior; (2) Intercloud linkages that deal with issues such as how the LAN mechanisms and structures can be made to span clouds and how potential address allocation conflicts are handled; (3) a Communication Subsystem that deals with how to establish WAN and dial-up (i.e., remote access) connectivity, how to adapt to differing network performance (e.g., 28.8 Kbps versus 100 Mbps), and how to handle unexpected link failures; (4) a File System that deals with how to ensure file coherence, how to provide a seamless view, and how to manage updates; and (5) a set of Security Mechanisms that deal with what is an acceptable security model and how to handle multi-domain security. These issues are addressed below.

In general the desired behavioral differences between intra-cloud and inter-cloud processing are encapsulated in a policy subsystem. The following are some policy concerns.

First, it may be desirable to address availability issues. It may be best not to replicate remotely for availability. In other words, do not push pages remotely (to a remote cloud connected via a WAN or modem) if it is possible to avoid doing so. Each cloud maintains its own minimum set of core copies. Thus, if two clouds are each sharing a page and each side has at least one core copy, both should replicate the page locally to create the minimum number of core copies required for availability locally, without regard to the remote copy or copies. Portable computers are essentially clouds with only one node, and thus their availability policy simply requires there to be one core copy of each core page on the local disk of the computer.

Second, there is a strong bias against creating core copies across inter-cloud links. Do not create local core copies except for "marked files" and "files in recently activated folders/applications," except maybe if the "remote cloud" is a portable that is LAN-connected for a long time.

Third, there is a strong bias towards creating loose copies across intercloud links. A "loose copy" of a page (in contrast to a core copy) is a copy stored on a persistent storage device (e.g., a local hard disk of a network node) that is not updated whenever a node modifies the page. To ensure consistency, when a loose copy of a page is activated on a node, its version number is checked against that of any core copy, and if they match, the contents of the loose copy are up-to-date and thus can be served, otherwise the contents of the loose copy are discarded and a new copy of the page's data is loaded from a core copy. Loose copies have good read characteristics, although it may be desirable to aggregate version number checks for blocks of related pages across a slow link. Core copies require flushing on every update across a slow link. This is a bad idea unless the local read rate justifies it. Rather than synchronously updating core copies across slow links, it generally is better to update copies asynchronously in the background if access is frequent enough to warrant doing so.

Fourth, it may be desirable to keep decisions local. Push all local core copies to a remote cloud, thereby ditching all local copies, if the ratio of remote flushes to local accesses is high. If a remote node pushes a core copy to us, only create extra local core copies if needed. In general, do not track the number or location of copies on the remote side. Instead, let the proxy over there worry about it.

Fifth, it is presently preferred always to treat portable (i.e., remote access) computers as a remote cloud.

Inter-cloud Operation

In brief, various aspects of the invention include the ability to maintain unique global addresses across all clouds and to perform all operations even when two or more clouds are interconnected. The invention does not allow the same address to be allocated in more than one cloud. Also, the invention tolerates the connection of one cloud or network to another (or to two or more already-interconnected networks), the disconnection of a network, and/or the reconnection of a network while maintaining and allowing normal operations by all nodes in the cloud(s).

Addressing Between Disjoint Clouds

Addressing is an important issue for disjoint clouds. It must be possible for a node on a "foreign" cloud to gain access to a file folder or other structured storage entity shared between clouds via the common shared memory system. At the file system level, files and folders are collections of pages in which addresses are used to add structure. For example, inode pages contain addresses pointing to the associated file data pages and file system directory pages contain addresses pointing to inode pages. Because file system data structures contain addresses, there is a issue of how to handle addresses that were allocated in a remote cloud if the file system is going to be able to interpret folders created in that cloud.

It is required that DSM consumers (e.g., a shared file system, database, email repository, web server, etc.) be able to use the same addresses to refer to the same data in all clouds that are collaborating. That is, globally unique addresses are needed across all interconnected and interoperating clouds. Thus, file system metadata contents can be interpreted normally whether or not the inode refers to a purely local file or a file being shared between clouds. Several issues arise when trying to ensure that addresses have the same meaning in all clouds sharing a file. Since it cannot be guaranteed that collaborating clouds will be able to communicate when the original pages are being allocated (e.g., because the file is created before the containing folder is ever exported to a remote clouds), it must be the case that either (i) two clouds will never allocate the same address or (ii) conflicting address regions are repaired whenever two clouds first connect. The presently preferred solution is to provide a single universal address space across all clouds by carefully segmenting the 128-bit addresses. It is proposed that addresses be segmented into two pieces, a 40-bit node header and an 88-bit address. This specific division of 40 bits and 88 bits is somewhat arbitrary. It generally is important, however, for the node field to be large enough to be unique for all node licenses and the address field to be large enough to not allow any given node to run out of address space. The 40-bit header is a unique per-node value based on the node's license number. A node header was selected rather than a cloud header because it solves the problems of mapping clouds to licenses and because it allows for multi-cloud nodes. Bundling the header with the license allows the 40-bit field to be used as a densely packed uniqueness identifier. Given this division, addresses can be guaranteed to be unique if each node allocates addresses only with its node header.

Note that although the address space is segmented by node license, this segmentation only refers to how addresses are allocated. A node with a 40-bit tag of 0xABC014011E would be the only node that could allocate an address with those 40-bits in the tag portion of the address, but after allocation, the creating node plays no special role in maintaining the coherence or availability of that page. Once allocated, all core copies of the page could migrate to remote nodes or even remote clouds.

Performing Cross-cloud Operations Via a Proxy Mechanism

In the preceding section, a mechanism is described for ensuring that addresses are globally unique across all clouds by restricting the address range from which a given node can allocate pages. This design guarantees that a file system metadata page shared between two clouds will point to the same pages in both clouds, or will be inaccessible in one cloud, and thus force it to be acquired from the remote cloud as described below. As a result, at the file system level a file shared between two clouds is essentially identical to a file contained solely within a single cloud.

The major difference between a file shared within a single LAN cloud and between two or more clouds occurs at the global addressing memory engine level. The three most important data structures at that level for managing the location and consistency of a shared page are the Global RAM Directory (GRD), the local RAM copyset structures, and the Global Disk Directory (GDD). The global directories can be managed by walking a tree from root to desired leaf node, "paging" in the appropriate pages as you need them. One way to extend the GRD and GDD semantics across clouds would be to simply integrate the clouds' directories into unified directories, and transfer the needed directory pages between the clouds on demand. However, there are a number of serious problems associated with integrating two or more clouds in this fashion including: (i) performance: paging data across a slow link is time consuming; (ii) reliability: links (or pages) between clouds are expected to fail far more often than a single segment LAN which would result in frequent and expensive directory rebuilds; and (iii) security: a malicious or buggy engine in a remote cloud would be able to access any and all of a cloud's data if it could manipulate arbitrary engine directory entries. For these reasons, a proxy mechanism for manipulating disjoint directory structures is used in one embodiment.

Introduced now is the notion of remote cloud identifiers (RCLids). An RCLid acts as a virtual placeholder for one or more cloud identifiers (CLids) in a remote cloud. For example, if an RCLid is found in a core copy member list, this means that one or more core copies of the page are present in the remote cloud. Similarly, an RCLid in a RAM copyset means that one or more remote nodes are currently being served RAM pages from the local node. RCLids are opaque such that a member of one cloud cannot tell how many nodes in the remote cloud are represented by a given RCLid. It may be necessary for the RCLid associated with a particular cloud to be unique and identical for all clouds that are sharing with that particular cloud. It needs to be ensured that RCLid values never collide with CLid values.

Operations involving RCLids must be performed via the proxy mechanism. At its most basic, the proxy mechanism involves contacting a node willing to act as a proxy for the nodes represented by the RCLid. There are a number of ways to implement the proxy mechanism. The proxy node could be a single special member of the remote cloud through which all operations to that node must pass. The proxy node could be a single special member of the local cloud that knows how to perform operations in the remote cloud. As another alternative, the proxy node could be a single special member of the local cloud that knows how to talk to a special proxy "server" node in the remote cloud to have it perform requested operations. Each of these options has certain strengths and weaknesses. In one embodiment, the basic mechanism utilized is as follows. A local node is designated to act as the proxy for an entire remote cloud, which it will do by communicating with a peer in the remote cloud. Note that this does not mean that the virtual node maps to a single physical node. This approach has some significant advantages. First, it provides a single point to handle sporadic connectivity. Since a local node is acting as the proxy, it will be available even if the communication link falls. It can enqueue operations that must be applied when the link returns. It also can transparently "failover" to a different remote node should its remote peer "server" fail. Second, it provides a local framework from which to consider asynchronous lazy inter-cloud protocols.

Assuming a remote node is the proxy or is acting as the proxy server for a local proxy node, consider what must be done to activate (or flush to, or . . . ) a core copy represented by an RCLid. The node that wants to perform the desired operation will specify the RClid as the destination node for the desired engine operation, but the communications layer will redirect the request to a CLid that is currently serving as a proxy node for that RCLid, marking the request as being a proxy request. Upon receiving the request, the remote proxy server node will execute the request in the remote cloud on behalf of the original requester. Depending on the semantics of the operation, the proxy server node may contact multiple nodes local to its cloud as part of performing the operation. For example, a request such as "activate a core copy and send me the page contents" can be handled by any core copyholder, while a request such as "invalidate all copies of this page" would need to be sent to all copyholders in the remote cloud. The identity of the nodes that need to be contacted can be determined by the proxy node from the remote cloud's metadata (e.g., the local core copy holders can be determined by walking the remote GDD). More specific details of the proxy mechanism for various types of engine data structures are disclosed below.

Example of Inter-cloud File Sharing

Figure 12A:
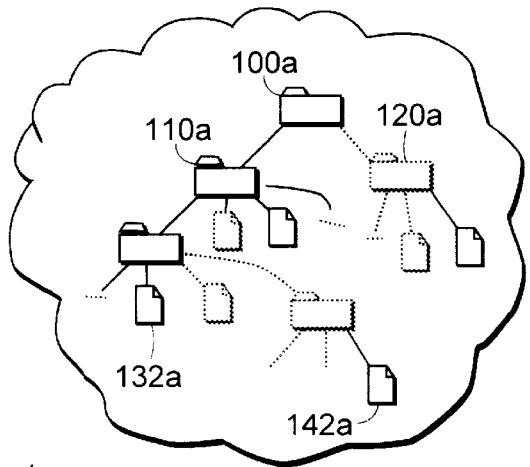
FIGS. 12A and 12B are diagrams showing two networks sharing files in accordance with the invention.
Figure 12A:
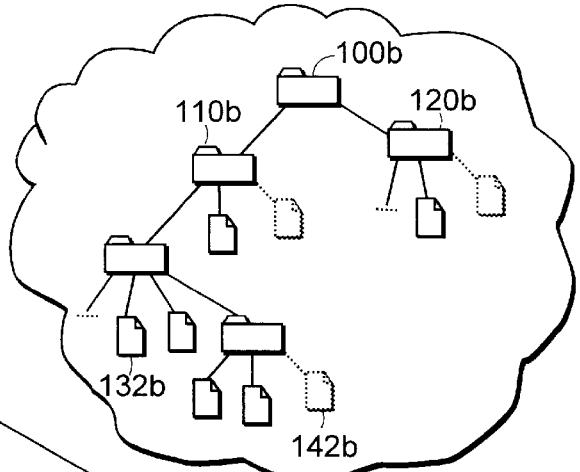
Figure 12B:
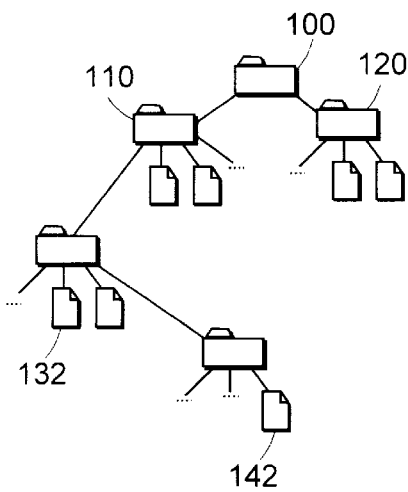

Referring to FIGS. 12A and 12B, in which a shared file system tree is depicted between cloud A and cloud B wherein solid lines represent having copies of blocks composing an object stored locally and dashed/dotted lines represent having no local data for those pages, both a physical view (FIG. 12A) and a logical view (FIG. 12B) of the file system are shown. The physical view of clouds A and B show what files are on what cloud, while the logical view shows how all files are part of a single logical tree structure. In FIG. 12A, some directory files are stored in both cloud A and cloud B such as files 100 and 110. Some directory files are physically stored only in one cloud such as file 120 (on cloud B). The same is true for user files. That is, user file 132 is common to both clouds, while user file 142 is not replicated on both clouds and instead is on only cloud A While we are looking at file 142, it should be noted that directory trees do not need to be fully connected above a file for the tree to be cached locally. File 142 in cloud A shows a tree that is not fully connected as shown by the location of file 142 in cloud A's tree of FIG. 12A. However, when a directory tree is not fully connected, while an unconnected file (like file 142) may be cached locally, that unconnected file will be unavailable if the clouds disconnect at a point when the file is unconnected in the tree structure.

Figure 13:
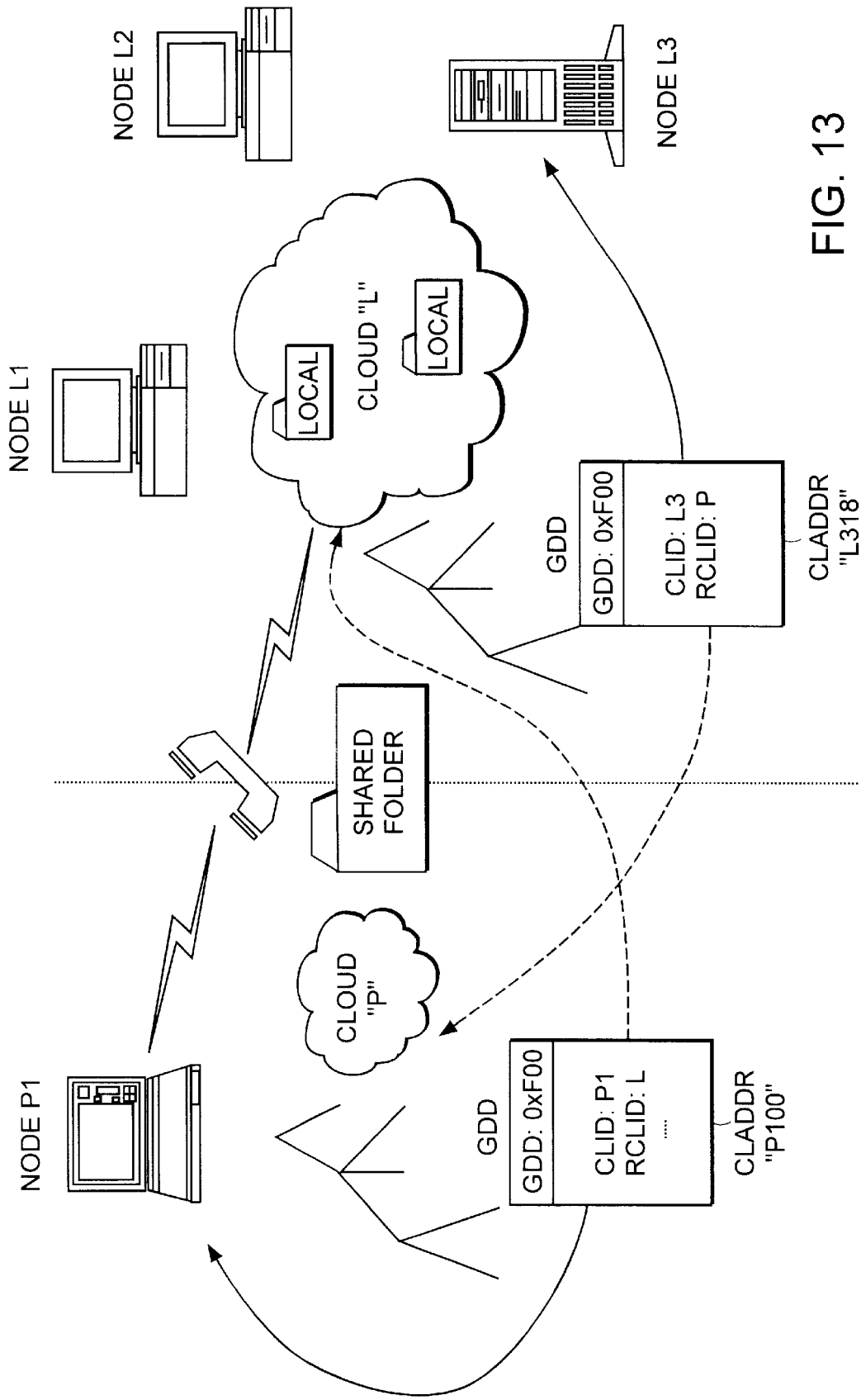
FIG. 13 is a exemplary diagram of a globally addressable storage engine being used to share a folder in a multi-network environment with a remote access computer dialed in via a modem and the telephone lines, according to the invention.

Consider the case illustrated in FIG. 13 where two clouds are shown sharing a folder and where an example of how file sharing can be implemented is depicted. Suppose that somebody in "cloud L" (i.e., the cloud on the LAN) has created a shared folder and has exported it to somebody in "cloud P" (i.e., the cloud with a portable, remote access computer). For simplicity, only the disk metadata is shown in FIG. 13. The RAM metadata would look very similar. First, some general observations: (1) the addresses that make up the file system directories, files, and metadata are identical in cloud L and cloud P (e.g., the page at address OxF00 represents the same file system file data page in both clouds); (2) the GDDs in both clouds are independent except that the leaf nodes representing the shared pages must be coordinated, and the pages that hold GDD pages are at different addresses (e.g., the GDD page that contains the leaf entry for page OxF00 are mapped to pages P100 and L138 in clouds P and L respectively); (3) nodes in a local cloud are represented by individual CLids and, in this case, each cloud has one core copy of the page that is stored on nodes P1 and L3 in cloud P and cloud L, respectively; and (4) all nodes in a remote cloud are represented by a single RCLid and, in this case, each cloud knows that the remote cloud has at least one core copy of the page as represented by the RCLids in each GDD entry.

The topic of establishing a connection for the first time is now addressed. Thereafter, normal operation is disclosed.

Initiating an Inter-cloud Connection

Assuming that a convenient GUI mechanism (e.g., Explorer property sheets) exists to allow users to designate folders for sharing and to specify a set of users who are allowed access, the information that must be exchanged when two clouds first connect is as follows. When a connection between two clouds is first established, the clouds exchange three pieces of information.

First, address ranges from which nodes in each cloud allocate pages are exchanged. Remember that a key issue in this invention is how to resolve "remote" addresses. This is handled as follows. When a cloud connects to a remote cloud, it imports a list of client headers for nodes in that cloud. This list implies a set of address ranges that can be allocated by members of the remote cloud. The list is walked and a GDD entry is added for each list element to represent the associated address range. For example, if the remote cloud has two nodes with client tags 0xABC014011E and 0x123f0tf3afc, entries for address ranges 0XABC014011E00 . . . 000 through 0xABC014011EFF . . . FFF and 0x123F0F3AFC00 . . . 000 through 0x123F0F3AFCFF . . . FFFF must be added to the local GDD with the RCLid for the remote cloud as the sole core copy holder. This guarantees the ability to resolve any address found in a page that is imported (e.g., the addresses that are found in the root of the imported folder can be resolved). Referring to FIG. 10, this operation would correspond to adding a new address range to the root directory page 342 for each client header received as part of the initialization process, with the remote cloud's RCLid as the responsible node field.

Second, the address of the root of the shared folder must be exchanged. As part of setting up the virtual folder on the remote cloud, it needs to know the address of the root of the shared folder from which it can bootstrap itself Third, information concerning how to contact a local proxy to resolve an RCLid must be exchanged. Depending on the specific proxy mechanism used, each node will need to send one or more IP addresses for local nodes that can act as proxy servers for remote requests.

Normal Inter-cloud Operation

Once two clouds have exchanged their initial information, normal operation can occur. During normal operation, it is possible for nodes in either cloud to access, lock, modify consistently, flush, etc. arbitrary data (file system) pages in the shared collaboration. Normal operation is as follows.

First, when a node attempts to access a shared page for which it does not have a local core copy, including pages that have never before been accessed in that cloud, it will find an entry for a range of addresses spanning that page in its local GDD containing an RCLid pointing at the page's original home cloud. In this case, it sends a proxy RPC request to the remote cloud to activate the page.

Second, when a node wants to modify a GDD entry that is shared (e.g., it wants to create a core copy for data created remotely in the local cloud for the first time), it locks its local GDD page for that entry (using the GDD traversal mechanisms) and then sends a proxy request to the appropriate proxy node. When the proxy server has completed the operation (traversing its GDD, locking pages, adding an RCLid representing the node that is creating a new core copy to its GDD entry, etc.), it responds back to the original requester, which completes the operation locally and unlocks its local GDD page. In the case of near-simultaneous requests by both clouds (e.g., a node in both clouds wants to manipulate a GDD entry on a particular GDD page simultaneously), an exception mechanism is used to break the tie (e.g., the node in the lower numbered cloud loses and unlocks the page).

Third, to handle sharing, the GRDs on each cloud must be synchronized. The approach involves proxying the GRD mechanism similar to how the GDD operations are handled. For example, a remote GRD lookup is invoked whenever an attempt is made to activate a page with remote core copies prior to activating a local core copy, since a remote node might have the associated file open in shared mode and changes must be consistent with any remote changes. In the case where both a local and remote core copy exists, it might be preferable to activate a local core copy and communicate with the remote GRD asynchronously to see if there is a sharing collision and/or inform it that an active copy of the page exists. Note that, in an alternative embodiment, the GRDs are treated the same as the GDDs. In this alternative embodiment, the structure and functionality of the GRDs generally is the same as the GDDs.

Fourth, to handle cross-cloud migration, it is possible to follow RCLids across multiple clouds, starting at the original "home" of a page until a core copy is found. Essentially, the RCLids can be used as forwarding pointers. As an optimization, it is possible to start anywhere having a copy of the page if the location of any copy can be determined without contacting its original "home."

Disconnected Operation

The invention supports modification of shared files across clouds both while connected and while disconnected. While connected, the file system will simply operate as it does in the environment provided by the base version of the technology that is described hereinabove, perhaps with minor changes for performance reasons.

To provide seamless directory views and file coherence, the invention requires that if a cloud contains a core copy of any page(s) of a file, it must have a core copy of all pages in the file. This axiom will be applied, on mobile systems, to all file system directory pages and to the contents of data files that are targeted for disconnected access. Given this assumption, disconnected operation and reconciliation will now be explored.

In the disconnected case (that is, when there is no communication channel between two clouds because of either a voluntary or involuntary network disconnect), the file system must be able to detect and resolve file update conflicts. This processing cannot be performed at just the page level because of atomicity requirements at the file level.

The implementation mechanism for this solution exploits a synergistic file system/engine relationship. The RCLid proxy mechanism will drive and control disconnected operation. This isolates the unique connectivity requirements of mobile and WAN from the core components. The file system is responsible for providing assistance with file level coherence. This assistance will take the form of page type specific exception and reconciliation handlers.

The general model here is that when the RCLid proxy has declared a remote cloud inaccessible, it will drive disconnected processing via an exception handling mechanism for RCLid operations. This mechanism will be based on page type. Exceptions on loose copies are handled as in the base engine design described hereinabove; that is, the pages are dropped and the attempted access fails with an appropriate error code. Exceptions on core copies are handled with a special symmetric logging facility, as described below. In particular, during a communication outage, all clouds with core copies of a page must engage in file system-level state logging when a shared file or directory is modified. Exceptions on tight copies, a postulated new page type for mobile systems, use asymmetric logging. This means that logging is performed on the mobile system, but not in the base cloud, if one of the clouds is a lone portable remote-accessing computer.

Page update failures that occur to an RCLid are handled specially. When an update to a page containing an RCLid fails, the proxy returns a remote update failure error code. For user data pages, remote update failure means that the copyset entry associated with the RCLid should be flagged as suspect, but no other error recovery is needed at this time. For file system metadata, the remote update failure needs to be reflected up to file system in addition to marking, the copyset entry as suspect. In response to notification of the failure, file system will generate a reconciliation log entry that identifies the file operation that failed. The file system hands this log entry to the RCLid proxy. The log entry represents an operation to be performed by file system during the proxy-driven reconciliation process.

Reconciliation

Reconciliation is the process whereby the contents of two clouds are synchronized when the communication channel between two previously disconnected clouds is re-established. As part of the reconciliation process file system directories and metadata will be made coherent. At the time reconciliation begins, data files will be in one of three states: (1) the file has no changes—following reconciliation, the file is unchanged; (2) the file has been changed on one system (i.e., cloud)—following reconciliation, the new file is visible everywhere; or (3) the file has been changed on both clouds—following reconciliation, there are two copies of the file and both are visible and independently addressable everywhere.

Reconciliation is driven by the RCLid proxy mechanism, and is primarily a proxy to proxy operation. When communication is reestablished after a failure, the proxy mechanism determines that the remote cloud is again accessible, and both sides enter into a reconnecting phase. For each reconciliation, one cloud is designated the reconciliation master. In the case of a mobile node reconnecting to a base cloud, the master is always the base cloud. For cloud to cloud WAN configurations, one side is arbitrarily picked as master. The master cloud spawns a reconciliation process to perform reconciliation—this process can be a thread within file system or a separate driver module. It may be that each consumer of the shared memory engine (e.g., the file system) will need to provide a reconciliation process tailored for its specific needs. In this way, it is possible to continue to separate the functionality of the engine from that of its consumers, placing the consumer-specific reconciliation logic in a consumer-specific reconciliation process and the engine-specific reconciliation logic in the proxy mechanism.

To reconcile two clouds, the reconciliation process in the master cloud fetches the other cloud's reconciliation log, which contains the set of file updates that need to be applied. Reconciliation log entries contain the following information: (1) filename—the complete path of the file on which the operation was performed; (2) operation—the operation that was performed (e.g., create, delete, rename, append, . . . ); (3) inode—the address of the file's inode—this could be extracted from the directory file that of the directory in which the file resides, but for simplicity it is replicated in the log entry; (4) previous timestamp (or version number)—information about the state of the file when it was last reconciled, which can be used to detect concurrent updates on both clouds; and (5) auxiliary information—certain operations will require additional information, such as the destination file name in the case of a rename or the number of bytes and their offset in an append.

The master cloud parses the reconciliation log, and for each reconciliation log entry it performs a series of operations in its local cloud, interacting when appropriate with the remote cloud.

The following example should illustrate the kinds of operations that the reconciliation process will need to perform. Suppose that the two clouds in question are a portable and its base LAN cloud, and that the file \tmp\foo was created on the portable when it was disconnected. In this case, the LAN cloud is designated master and drives the reconciliation process. As a result of the file creation, there will be a log entry on the portable of the form (\tmp\foo, create, <inode address>, <null>). Assuming that tmp already exists in the base LAN cloud (if not, the creation of \tmp will appear before the creation of \tmp\foo in the reconciliation log and thus should already have been created), this entry is reconciled as follows. The reconciliation process: (1) locks the tmp directory in the master cloud so that it can update its contents atomically; (2) compares the previous timestamp of the file with the current timestamp in the base cloud—if they differ, there was a write-write conflict and reconciliation on this file proceeds by creating a new file containing the data from the portable, as described below; (3) locks the <inode address> page using the normal engine mechanisms, which will involve the proxy mechanism locating the page in the slave cloud, locking it, and forwarding its most recent contents to the master cloud; (4) allocates an entry for foo in tmp with the appropriate file information and inode address—if the file is to be cached locally, which is always the case if the remote cloud is a portable, a local core copy of the inode page is created and its contents are stored locally; and (5) unlocks the tmp directory to allow other clients to access its contents.

After completing the basic metadata reconciliation, it is possible to begin loading the file data asynchronously as the reconciliation process handles the next log entry. As an alternative, the data transfer could be performed synchronously, and thereby guarantee that when a file shows up in a directory that its contents are quickly accessible, at the expense of slowing the rate at which metadata is reconciled and the user is notified about potential conflicts.

The base case described above is fairly straightforward. It gets tricky, however, when the file has been modified on both sides of the link, or apparently self-contradictory operations are performed while disconnected. If the file has been modified on both sides of the link, which can be detected using the timestamp comparison mechanism described above, the reconciliation process needs to create a new file, rather than replacing the contents of the old file. For now, a simple user interface is used for this. If the reconciliation process determines that a file has been created and/or modified on both sides of the link while disconnected, it will create a new file with a ". #" extension, where the value of # is one greater than the highest numbered. # file that exists with the same file prefix in that directory (e.g., foo. 1, foo.2, foo.3). Any similar user interface would be fine. There also are some apparently self-contradictory operations that can be detected, e.g., if the file is modified on one side of the link and deleted on the other, and handle specially. In the case where a file is deleted by one cloud and modified by another, it makes the most sense to simply "undelete" the file in the cloud where it was deleted, filling it with the new data.

Special needs of the reconciliation process are accommodated. For example, if a file is modified in-place on both sides of the link, the reconciliation process needs to be able to access the contents of the page(s) associated with the file from the remote cloud. Since these pages are at the same addresses as the newly modified local file's contents, it generally is not possible simply to access the page normally, because this would invoke the engine page-level reconciliation process and eliminate one of the versions of the page. Instead, it is desirable to acquire the remote contents while a copy-on-write is performed of the remote version of the file to a new file name with new addresses. Thus, it is necessary to have a way to request "page<foo>" from the remote cloud. For example, the proxy mechanism can be extended to do this without interacting with the local cloud metadata. In general, the base engine API may be extended for other reasons such as to get directly to the proxy mechanism (remote cloud) without interacting with the local cloud's metadata (e.g., "Invalidate your version of <address>").

At the conclusion of log processing, the master side is up to date. Once all the logs have been processed on the master, the reconnecting phase ends and the non-master side judiciously re-bootstraps itself This is a controlled, optimized reactivation of pages, starting with the GDD and continuing through a walk of the file system file directories. The ensuing page activations pull updated pages from the now up to date master cloud. Recurse till done. When the second cloud has finished bootstrapping itself, the two clouds are again in synch. Failures in the midst of reconciliation do not impact file integrity, because the use of locks lets us guarantee that file reconciliation is atomic at the file level.

Normal file system activity will continue (mostly) unhindered during the reconciliation process to reduce the visible impact of reconciliation to users. This is important because reconciliation is potentially a long process if there are a large number of changes that need to be reflected over a slow link. This goal can be accomplished in a number of ways. In general, the file-level locks that the reconciliation process and file system share can be used to avoid serving the contents of a file or directory while the reconciliation process is in the process of reconciling that file or directory. In other words, reconciliation is atomic with respect to normal file access to the same file. If a user attempts to access a file that is not yet reconciled, the old local data is served to the user. Changes to the slave filesystem will be appended to the end of the reconciliation log and need to be handled until reconciliation is complete. As an optimization, it is possible to introduce some form of communication between the file system and the reconciliation process to cause that file or directory to be reconciled synchronously at a high priority so that the file system can serve the most up-to-date data (i.e., shift the lazy reconciliation to a synchronous reconciliation for that file).

In reconnection processing and recovery, it generally is not acceptable to perform metadata rebuilds based solely on a local cloud's aggregate state. This is because proxy nodes are never used by the "quorum" mechanism (which ensures that a quorum of the core copies of a page are accessible before it can be accessed) and thus both sides would be able to access and modify pages for which they have local core copies. Thus, if the rebuild operations simply "forgot" about the remote cloud's copies of pages, the result would be a failure to detect and reconcile changes that occur while disconnected. Still more complexity is added when file coherence requirements are considered. The solution is two fold. First, the file systems are reconciled. During this reconciliation phase, both sides continue to operate in a special, disconnected manner called the reconnecting phase. Once this phase completes, the proxy can re-engage inter-cloud engine operations.

The state of the system, following reconciliation, is simple. The file system directories and metadata will be made coherent. Data files will be in one of three states, depending on what changes were made to the file while communication was down between the clouds: (1) no changes were made to the file in either cloud—following reconciliation, the file is unchanged everywhere; (2) the file changed in one of the clouds following reconciliation, the new file is visible everywhere; or (3) the file changed in both clouds—following reconciliation, there are two copies of the file (e.g., foo and foo. 1), and both are visible and independently addressable everywhere.

The reconnecting phase of reconciliation is driven by the RCLid proxy and is primarily a proxy-to-proxy operation, as described above. When reconciliation has been completed in both clouds, they both execute a restart-type mechanism (such as the mechanism described in attorney docket no. CLC-005 filed on the same date) to reconcile their RAM subsystems and then continue normal operation. This mechanism is described in the following paragraph.

Before describing the restart mechanism mentioned in the preceding paragraph, it may be helpful to point out that pages with global RAM directory (GRD) information are a special case of volatile pages. These pages are not backed up to redundant, reliable, persistent disk storage, and they are frequently modified. GRD pages enable the location of other volatile pages to be identified. When two clouds reconnect, both clouds stop processing normal requests until the GRD has been reconciled, and all notions of copy hierarchies as well as the entire GRD are discarded in both clouds. Each cloud's GRE) is then synchronously repopulated with the contents of each node's local RAM cache. More specifically, one of the nodes on each network is designated as a master for the reconciliation, and this master then queries synchronously all of the other nodes in the local cloud and the remote proxy node to determine the contents of the local RAM cache of each of those other nodes (or the entire remote cloud in the case of the proxy node). The master then uses the information it obtains from the local RAM caches to rebuild a GRD for the combined cloud. The clouds then resume operation, with the non-master nodes obtaining a copy of their local cloud's GRD during the course of normal operation. This reconciliation GRD rebuild process is bounded and guaranteed to terminate with all surviving GRD pages at the master node in a finite amount of time, barring failures during the reconciliation process. Such during-reconciliation failures will result in starting the same recovery process again, this time without the nodes that have failed.

Transitioning from Normal to Disconnected Operation

One difference between the invention and the above-described base version of the globally addressable storage technology is the impact of communication outages. Unlike the above-described technology that supports only single-segment LANs, the invention can suffer from network partitions where multiple nodes can become "unavailable-"without crashing. A common situation involving a partitioned network is expected to be a disconnected portable operating in isolation. When communication between clouds fails, both sides will continue normal operation to the extent possible.

There are broadly five states that a page can be in at any given time: (1) The page has no RCLids in its disk core copyset, and thus all core copies reside in the local cloud. (2) The page has only RCLids in its disk core copyset, and thus no core copies reside in the local cloud. (3) The page has both local CLids and RCLids in its disk core copyset and is active in the local RAM subsystem. This situation occurs when the page has been activated by one or more local cloud members from a local core copy. In this case, the page can be located via the local cloud's GRD. (4) The page has one or more RCLids in its disk core copyset, is not active in the local RAM subsystem, but is active in the local Disk subsystem. This situation occurs when a remote cloud has activated the page from a core copy in the local cloud. (5) The page has both local CLids and RCLids in its disk core copyset, but is inactive in the local cloud.

Communication failures (e.g., network partitions) or node failures can be handled fairly easily in cases (1) and (2) by a simple extension to the existing access mechanisms. In case (1), local access to the page should not be impacted since we have direct access to all core copies of the page. In case (2), local access to the page should be aborted since we have direct access to none of the core copies of the page. The more interesting cases are numbers (3), (4), and (5) when both the local cloud and a remote cloud have core copies of the page. In these cases, both clouds are allowed to continue accessing (and even modifying) the pages when disconnected. In cases (3) and (4), the engine metadata is rebuilt using a restart/recovery mechanism like the one described previously to handle the fact that a page was being actively shared across clouds. In all three cases, care should be taken regarding how subsequent page accesses are handled until communication is reestablished with the other core copy holder(s).

Given the above, network partitions can be handled via two separate mechanisms, partition detection and metadata rebuild.

More specifically, proxy nodes (represented by RCLids) are treated as virtual nodes in the local cloud for the purpose of connectivity checking. In other words, the remote cloud looks like a single virtual node in the local cloud. As part of emulating a local cloud member, the proxy mechanism includes an inter-cloud heartbeat mechanism. A remote cloud's local proxy will respond (or choose not to respond) to queries based on whether or not the remote cloud is accessible. The inter-cloud heartbeat is independent of and hidden from the local cloud heartbeat mechanism. Also, the inter-cloud heartbeat is only performed while there are pages actively shared between clouds.

In summary, the invention makes it possible to detect connectivity loss between clouds, maintain quorum independently in both clouds, and trigger exception-based processing when RCLid page updates are requested during periods of lost inter-cloud connectivity. Once connectivity is lost, the RAM subsystem is rebuilt. Subsequent page update failures that occur to an RCLid are handled specially.

Security

The security design for the above-described base global addressing system addresses the two fundamental network security issues of authentication and authorization. Authentication involves, for example, how user accounts and passwords are managed and validated. Authorization involves, for example, performing access checks on authenticated users to determine what such users are actually allowed to do on the network. With the invention, the same fundamental questions and issues are addressed, but the solution is different because the invention involves two or more interconnected and interoperating networks.

In general, existing network security mechanisms are relevant and meaningful only for nodes on the network. Nodes on a first network typically will utilize a separate security mechanism from the one utilized by nodes on another network. The security domains of different networks generally do not inter-relate or work together to allow access by a node on a remote network. The invention, however, involves two or more interoperating clouds (i.e., two or more interconnected and intercommunicating networks such as two or more LANs), and thus the invention must address, and does, the issue of extending the traditional single-network security mechanisms to a multi-network, interoperation environment. With the invention, the same fundamental questions and issues of authentication and authorization must be and are addressed, but the invention involves spanning security environments (or domains).

The security model of the invention partitions responsibility for user authentication between the file system, which performs user/file-level authentication, and the engine, which performs cloud/page-level authentication. These two basic forms of authentication are described in the following two subsections—file-level security and page-level security.

File-Level Security: Responsibility for file-level security is divided in a manner similar to how management of engine metadata is partitioned. Each cloud retains its own independent security domain, similar to the way in which each cloud maintains its own GDD and GRD, and then a proxy mechanism is provided for performing intercloud security-related operations (both for adding remote users to file ACLs and for validating users). In particular, it is not required that accounts be created in all clouds for all users. For example, to extend cleanly the Windows NT file sharing user interface to the invention, it must be known what users in the remote cloud may share files that are in a shared fileset so that different levels of access can be given to different users in a remote cloud (via the ACLs mechanism).

A "virtual account" is introduced to the local security database to represent all of the accounts in a remote cloud, analogous to how an RCLid represents a set of nodes in a remote cloud. This virtual account in the security database is called a Virtual Account (VA). When a user pulls down the security property sheet associated with a file, the file system will use a simple proxy mechanism to translate any VAs that it finds in to the list of users in the associated remote cloud (and an indication that they are remote users). A user with sufficient privilege on a file can set up an ACL for a remote user by selecting that user from the property sheet and specifying its access rights. This will cause a new ACL to be added to the file's ACL stream. The notion of Access Control Entries (ACEs) is extended to allow them to contain cloud-qualified user names (e.g., Jones@Acme or Smith@ABC Corp.), so that ACEs of shared files contain both the userid and domain/cloud identifier of the associated user. This allows protections to be added to files and interpreted by either cloud. Virtual accounts are never authenticated within the local cloud. They are present only for usage in property sheets. When a user attempts to access a file, file system looks in the file's ACL stream for an ACE matching the requesting user and the local cloud. ACL checking on files is always a local function. All access checking is local to the cloud where the associated user has an account. To ensure that all ACEs that all ACEs in shared files are fully attributed (i.e., contain both a userid and cloudId/domain), it is required that the act of exporting a file set to another cloud for the first time involves adding cloudId/domain information to the file set's ACEs.

Page-Level Security: In addition to file system level security, it is necessary to control unauthorized access to pages by untrusted (or not completely trusted) clouds. Each cloud is in a separate security domain, and only the identified filesets can be shared among the plurality of security domains. Other information is not allowed to be shared among clouds. This issue is addressed by having clouds authenticate each other as part of the proxy mechanism, and then verifying for each page request that the authenticated remote cloud has access rights to that page. The key to this level of security is the interface between file system and the engine by which file system can specify to the engine which clouds have access to which pages (because they have access to some fileset(s)).

Before fileset sharing can take place, both clouds must authenticate each other. Intercloud page sharing must ensure that only the pages that contain file system metadata and user data for a specific fileset are accessible between clouds. It must be ensured that a malicious, highly privileged user in one cloud cannot circumvent another cloud's security. Mechanisms for enforcing this level of access control are discussed in this section.

Exporting a fileset entails specifying what remote cloud(s) can access it. Before a remote cloud is first allowed to access a fileset, both the exporting cloud and the importing cloud must authenticate one another. This process is repeated each time two clouds connect to one another. As part of the engine proxy setup phase, each cloud authenticates the other. This is not peer-to-peer authentication. It is a pair of independent, client/server-style checks. Each cloud requests access rights to the other cloud, which gives the requester the right to activate pages and request RCLid's to be created in the other cloud's directory structure. This level of security allows each cloud to protect the integrity of its directory structures and control what pages it exports. Note that both authentication exchanges must be successful for the system to correctly operate.

The mechanism for performing authentication checks is to use distributed system security authentication techniques such as, for example, the SSPI on Windows NT. When inter-cloud sharing is initiated, each side exchanges (cloud name, password) pairs. The SSPI protocol performs challenge/response style authentication, where both a password and a private DES key are used to avoid various impersonation techniques. Strong security is provided here because of the ability of the invention to run over physically insecure WANs such as the Internet.

Once the clouds have successfully authenticated each other, it still is necessary to verify on each page activation that the page being activated is part of the fileset(s) to which the requester has access. This access check is performed as part of the proxy mechanism by the proxy server in the cloud exporting the page. The information that specifies what fileset a given page is in must be translated, via some efficient mechanism into a per address access right. Some workable alternatives are: (1) Combination of page type and parent fileset indicator—use the page type to distinguish file system data and meta-data pages and use an attribute to specify the fileset (specified at page allocation). (2) Aggregate address ranges by page types and store an ACL for the range in the directory b-tree.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computer system, comprising:
   a first computer network including a first plurality of computers sharing a first globally addressable storage system, each of the first plurality of computers including (a) a local volatile memory device for volatile storage, (b) a local persistent storage device for persistent storage, and (c) a shared memory subsystem for mapping at least a portion of the first globally addressable storage system to a portion or all of the volatile and persistent storage to provide thereby addressable volatile and persistent storage accessible by each of the first plurality of computers; and
   a second computer network located remote from and coupled to the first network, the second network including a second plurality of computers sharing a second globally addressable storage system, each of the second plurality of computers including (a) a local volatile memory device for volatile storage, (b) a local persistent storage device for persistent storage, and (c) a shared memory subsystem for mapping at least a portion of the second globally addressable storage system to a portion or all of the volatile and persistent storage to provide thereby addressable volatile and persistent storage accessible by each of the second plurality of computers;

wherein the first and second globally addressable storage systems interoperate to allow the first plurality of computers to access data on the second network including data stored in the local persistent storage devices associated with the second plurality of computers and to allow the second plurality of computers to access data on the first network including data stored in the local persistent storage devices associated with the first plurality of computers.

2. The computer system of claim 1 wherein the first and second globally addressable storage systems replicate data on the first and second networks among two or more of the first and second computers.

3. The computer system of claim 1 wherein the first and second globally addressable storage systems replicate data on the first and second networks among two or more of the first and second computers based on accesses by the first and second computers of the first and second globally addressable storage systems to obtain data on the first and second networks.

4. The computer system of claim 1 wherein the first and second globally addressable storage systems migrate data on the first and second networks among two or more of the first and second computers.

5. The computer system of claim 1 wherein the first and second globally addressable storage systems migrate data on the first and second networks among two or more of the first and second computers based on accesses by the first and second computers of the first and second globally addressable storage systems to obtain data on the first and second networks.

6. The computer system of claim 1 wherein the first computer network has a first security domain and the second computer network has a second security domain that is separate from the first security domain, and wherein the first and second computer networks share data between the first and second security domains.

7. The computer system of claim 6 wherein the first and second computers can set file-level or record-level access control rights on both the first and second computer networks.

8. The computer system of claim 6 wherein the first and second globally addressable storage systems control access to data based on passwords or security identifiers.

9. The computer system of claim 1 wherein the first and second computers can access shared data after the first and second computer networks are disconnected.

10. The computer system of claim 9 wherein the first and second computers can modify shared data after the first and second computer networks are disconnected.

11. The computer system of claim 10 wherein the modified shared data is reconciled after the first and second computer networks are reconnected.

12. The computer system of claim 1 wherein the first and second globally addressable storage systems utilize a proxy mechanism to maintain consistency of shared data.

13. The computer system of claim 1 wherein the first and second globally addressable storage systems utilize a global directory mechanism to track the location of data on the first and second computer networks.

14. The computer system of claim 13 wherein the first and second globally addressable storage systems utilize the global directory mechanism which includes a disk directory for tracking data stored on the persistent storage devices and a RAM directory for tracking data stored on the local volatile memory devices on the first and second computer networks.

15. A computer system, comprising:
 a computer network; and
 a plurality of computers coupled to the network and sharing a globally addressable storage system, at least one of the plurality of computers being located remote from the network and coupled thereto by a communications adapter, each of the plurality of computers including
  a local volatile memory device for volatile storage,
  a local persistent storage device for persistent storage,
  a shared memory subsystem for mapping at least a portion of the globally addressable storage system to a portion or all of the volatile and persistent storage to provide thereby addressable volatile and persistent storage accessible by each of the plurality of computers.

16. The computer system of claim 15 wherein the globally addressable storage system replicates data stored in the local persistent storage devices among two or more of the computers.

17. The computer system of claim 15 wherein the globally addressable storage system replicates data stored in the local persistent storage devices among two or more of the computers based on accesses by the computers of the globally addressable storage system to obtain data stored in the local persistent storage devices.

18. The computer system of claim 15 wherein the globally addressable storage system migrates data stored in the local persistent storage devices among two or more of the computers.

19. The computer system of claim 15 wherein the globally addressable storage system migrates data stored in the local persistent storage devices among two or more of the computers based on accesses by the computers of the globally addressable storage system to obtain data stored in the local persistent data storage devices.

20. The computer system of claim 15 wherein the at least one of the plurality of computers that is located remote from the network is coupled thereto by a modem.

21. The computer system of claim 15 wherein the shared memory subsystem of each of the computers includes:
 a distributor for mapping at least a portion of the globally addressable storage system across at least a portion of at least some of the local persistent storage devices to distribute the globally addressable storage system across these local persistent storage devices; and
 a disk directory manager for tracking the mapped portions of the globally addressable storage system to provide information representative of which of the local persistent storage devices has which portions of the globally addressable storage system mapped thereon.

22. The computer system of claim 21 further comprising a RAM directory manager for tracking the mapped portions of the globally addressable storage system to provide information representative of which of the local volatile memory devices has which portions of the globally addressable storage system mapped thereon.

* * * * *